mg>

(12) United States Patent
Cosoli et al.

(10) Patent No.: US 11,649,608 B2
(45) Date of Patent: May 16, 2023

(54) HYDRAULIC CIRCUIT FOR AN ADAPTIVE PARK BRAKING SYSTEM AND METHOD OF OPERATION THEREOF

(71) Applicant: DANA ITALIA S.R.L., Arco (IT)

(72) Inventors: Ettore Cosoli, Padua (IT); Matteo Grott, Villa Lagarina (IT); Davide Moser, Rovereto (IT); Giulio Ornella, Perrysburg, OH (US); Mark M. Schneider, Perrysburg, OH (US); Lorenzo Serrao, Nago-Torbole (IT); Bernhard Vecchioni, Riva del Garda (IT); Fabrizio Zendri, Rovereto (IT)

(73) Assignee: DANA ITALIA S.R.L., Arco (IT)

( * ) Notice: Subject to any disclaimer, the term of this patent is extended or adjusted under 35 U.S.C. 154(b) by 796 days.

(21) Appl. No.: 16/604,650

(22) PCT Filed: Apr. 10, 2018

(86) PCT No.: PCT/EP2018/059202
§ 371 (c)(1),
(2) Date: Oct. 11, 2019

(87) PCT Pub. No.: WO2018/189202
PCT Pub. Date: Oct. 18, 2018

(65) Prior Publication Data
US 2020/0071910 A1    Mar. 5, 2020

Related U.S. Application Data

(60) Provisional application No. 62/584,370, filed on Nov. 10, 2017, provisional application No. 62/484,158, filed on Apr. 11, 2017.

(51) Int. Cl.
*E02F 9/20* (2006.01)
*B60T 7/12* (2006.01)
*B60T 8/17* (2006.01)
*B60T 8/36* (2006.01)
(Continued)

(52) U.S. Cl.
CPC .............. *E02F 9/2083* (2013.01); *B60T 7/12* (2013.01); *B60T 8/1701* (2013.01);
(Continued)

(58) Field of Classification Search
CPC ... B60T 8/17; B60T 8/46; B60T 8/448; B60T 8/1701; B60T 8/1761; B60T 8/3605;
(Continued)

(56) References Cited

U.S. PATENT DOCUMENTS 3,922,855 A   12/1975   Bridwell
5,957,235 A    9/1999   Nishimura
(Continued)

FOREIGN PATENT DOCUMENTS

EP   1810906    7/2007
EP   2805858    11/2014
(Continued)

*Primary Examiner* — Thomas J Williams
*Assistant Examiner* — San M Aung
(74) *Attorney, Agent, or Firm* — McCoy Russell LLP

(57) ABSTRACT

A hydraulic circuit for an adaptive park braking system and method of operation thereof. The method of operating an adaptive park braking system includes providing a vehicle having a motor, a front axle system, a rear axle system, wherein the front axle system has one or more front axle braking systems and the rear axle system has one or more rear axle braking systems. Identifying when the vehicle is engaged in a digging operation. Disconnecting the front axle system or the rear axle system from driving engagement with the motor of the vehicle. Activating the one or more braking systems of the disconnect axle system to apply an amount of force to the disconnected axle system of the vehicle. Then applying an amount of torque with the motor to the axle system in driving engagement with the motor.

15 Claims, 9 Drawing Sheets

(51) Int. Cl.
*B60T 13/16* (2006.01)
*B60T 13/58* (2006.01)
*B60T 13/68* (2006.01)
*E02F 9/22* (2006.01)
*F02D 41/04* (2006.01)
*E02F 3/32* (2006.01)

(52) U.S. Cl.
CPC ............ *B60T 8/3605* (2013.01); *B60T 13/16* (2013.01); *B60T 13/58* (2013.01); *B60T 13/686* (2013.01); *E02F 9/2062* (2013.01); *E02F 9/226* (2013.01); *F02D 41/045* (2013.01); *B60T 2250/04* (2013.01); *E02F 3/32* (2013.01); *F02D 2200/501* (2013.01)

(58) Field of Classification Search
CPC .......... B60T 13/16; B60T 13/36; B60T 13/58; B60T 13/686; B60T 7/12; B60T 2201/10; B60T 2210/32; E02F 9/02; E02F 9/226; E02F 9/2083; E02F 9/2062
USPC ................. 701/99, 22, 33, 50; 303/3, 15, 20
See application file for complete search history.

(56) References Cited

U.S. PATENT DOCUMENTS

| | | | |
|---|---|---|---|
| 6,997,521 | B2 | 2/2006 | Jensen |
| 8,491,064 | B2 | 7/2013 | Petersson |
| 8,585,156 | B2 | 11/2013 | Udagawa |
| 9,248,757 | B2 | 2/2016 | Kuittinen |
| 9,394,924 | B2 | 7/2016 | Berg |
| 2005/0236195 | A1 | 10/2005 | Mietschnig |
| 2007/0205660 | A1* | 9/2007 | Carswell ............... B60T 8/1761 303/139 |
| 2009/0318263 | A1* | 12/2009 | Yuet .......................... B60T 7/16 701/99 |
| 2016/0375880 | A1* | 12/2016 | Farmer ................. B60T 13/662 701/50 |

FOREIGN PATENT DOCUMENTS

| | | | | |
|---|---|---|---|---|
| EP | 2949507 | | 12/2015 | |
| WO | WO-2008072662 | A1 * | 6/2008 | ........... B60T 13/686 |
| WO | WO-2013108888 | A1 * | 7/2013 | ............. B60T 13/168 |

* cited by examiner

HYDRAULIC CIRCUIT FOR AN ADAPTIVE PARK BRAKING SYSTEM AND METHOD OF OPERATION THEREOF

CROSS-REFERENCE TO RELATED APPLICATIONS

The present application claims the benefit to U.S. Provisional Patent Application No. 62/484,158 filed on Apr. 11, 2017 and U.S. Provisional Patent Application No. 62/584,370 filed on Nov. 10, 2017, which are incorporated herein by reference in its entirety.

FIELD OF THE DISCLOSURE

The present disclosure relates to a hydraulic circuit for an adaptive park braking system and a method of operating the hydraulic circuit of the adaptive park braking system.

BACKGROUND OF THE DISCLOSURE

Various types of excavating vehicles, or equipment, are known within the art to move an amount of material, such as but not limited to dirt, sand, soil, rock, minerals, concrete and/or asphalt materials, from one location to another. When digging, conventional excavating vehicles experiences a significant amount of movement, or oscillation, as a result of mechanical backlashes within the axle systems of the excavating vehicle. These mechanical backlashes within the axle systems of the excavating vehicle increases the amount wear on the various components of the axle and the braking systems of the excavating vehicle thereby reducing the overall life and durability of those components and increasing maintenance costs. Additionally, these movements, or oscillations, are translated through the excavating vehicle and to operator drastically reducing the overall comfort perceived by the operator. This increase in discomfort perceived by the operator results in more frequent operator breaks, more on the job operator injuries and an overall lower digging efficiency. Furthermore, these movements, or oscillations, often times creates a pit under one or more of the wheels excavating vehicle which reduces the overall stability of the vehicle.

The conventional method of reducing the mechanical backlashes within the axle systems of the excavating vehicle requires the use of complex and highly specialized braking systems that significantly increase the overall cost of the vehicle. It would therefore be advantageous to develop a hydrostatic circuit for an adaptive park braking system that will reduce and/or eliminate the mechanical backlashes within the axle systems of an excavating vehicle when digging in a cost effective manner.

SUMMARY OF THE DISCLOSURE

A hydraulic circuit for an adaptive park braking system and method of operation thereof. The method of operating an adaptive park braking system includes providing a vehicle having a motor, a front axle system, a rear axle system, wherein the front axle system has one or more front axle braking systems and the rear axle system has one or more rear axle braking systems. Identifying when the vehicle is engaged in a digging operation. Disconnecting the front axle system or the rear axle system from driving engagement with the motor of the vehicle. Activating the one or more braking systems of the disconnect axle system to apply an amount of force to the disconnected axle system of the vehicle. Then applying an amount of torque with the motor to the axle system in driving engagement with the motor.

According to an aspect of the disclosure, the method of operating an adaptive park braking system may further include the step of identifying whether or not the vehicle is moving when engaged in the digging operation identified.

According to any of the previous aspects of the disclosure, the method of operating an adaptive park braking system may further include the steps of determining the speed in which the vehicle is moving when engaged in the digging identified and/or determining the direction in which the vehicle is moving when engaged in the digging operation identified.

According to any of the previous aspects of the disclosure, the method of operating an adaptive park braking system may further include the steps of determining an amount of torque needed to reduce, minimize cancel out and/or eliminate the movement experienced by the vehicle when engaged in the digging operation identified, and applying the amount of torque determined to reduce, minimize cancel out and/or eliminate the movement experienced by the vehicle when engaged in the digging operation identified to the axle system of the vehicle in driving engagement with the motor.

According to any of the previous aspects of the disclosure, the method of operating an adaptive park braking system may further include the steps of monitoring and determining continuously the speed in which the vehicle is moving and/or the direction in which the vehicle is moving when engaged in the digging operation identified. Updating continuously an amount of torque needed to reduce, minimize cancel out and/or eliminate the movement experienced by the vehicle when engaged in the digging operation identified. Then changing continuously the amount of torque applied to the axle system in driving engagement with the motor based on the updated amount of torque determined to reduce, minimize cancel out and/or eliminate the movement experienced by the vehicle when engaged in the digging operation identified.

According to any of the previous aspects of the disclosure, the method of operating an adaptive park braking system may further include the steps of reducing and/or eliminating one or more pits generated under one or more wheels of the vehicle when engaged in the digging operation identified.

An adaptive park braking hydraulic circuit for use in a vehicle. The hydraulic circuit includes one or more service brake hydraulic lines with one or more brake pressure sensors that are in fluid communication with at least a portion of the one or more service brake hydraulic lines by one or more brake pressure sensor hydraulic lines. One or more service brake assemblies may be in fluid communication with at least a portion of the one or more service brake hydraulic lines. Additionally, the hydraulic circuit may include one or more adaptive park brake (APB) supply hydraulic lines and one or more power supply hydraulic lines. At least a portion of the one or more power supply hydraulic lines may be in fluid communication with at least a portion of a motor or pump having a line A and a Line B.

According to an aspect of the disclosure, the hydraulic circuit may include one or more parking brake hydraulic lines and one or more APB supply hydraulic lines. At least a portion of a first valve is in fluid communication with at least a portion of the one or more parking brake hydraulic lines and at least a portion of the one or more APB supply hydraulic lines. Additionally, at least a portion of one or more parking brake assemblies may be in fluid communication with at least a portion of the one or more parking brake hydraulic lines.

According to any of the previous aspects of the disclosure, the hydraulic circuit may include an adaptive park braking system supply circuit having a second motor or pump, a hydraulic output line, one or more intermediate hydraulic lines, one or more check valves, one or more accumulators, one or more hydraulic pilot lines, one or more hydraulic supply lines, a fifth valve and/or a seventh valve. At least a portion of the second motor or pump may be in fluid communication with at least a portion of the hydraulic output line and at least a portion of the hydraulic output line of the second motor or pump may be in fluid communication with at least a portion of the one or more power supply hydraulic lines. The one or more accumulators may be in fluid communication with at least a portion of the one or more hydraulic supply lines and/or at least a portion of the hydraulic output line by the one or more intermediate hydraulic lines having the one or more check valves. At least a portion of the one or more hydraulic pilot lines may be in fluid communication with at least a portion of the one or more hydraulic supply lines, at least a portion of the one or more intermediate hydraulic lines and the one or more accumulators. Additionally, at least a portion of the fifth valve may be in fluid communication with at least a portion of the one or more hydraulic pilot lines, at least a portion of the seventh valve may be in fluid communication with at least a portion of the one or more APB supply hydraulic lines, and at least a portion of the one or more APB supply hydraulic lines may be in fluid communication with at least a portion of the one or more hydraulic supply lines.

According to any of the previous aspects of the disclosure, the adaptive park braking system supply circuit of the hydraulic circuit may further include a sixth valve. At least a portion of the sixth valve may be in fluid communication with at least a portion of the one or more parking brake hydraulic lines and at least a portion of the one or more hydraulic supply lines.

According to any of the previous aspects of the disclosure, the hydraulic circuit may include a second valve that may be in fluid communication with at least a portion of the one or more service brake hydraulic lines and at least a portion of the one or more APB supply hydraulic lines. Additionally, the hydraulic circuit may include a third valve that may be in fluid communication with at least a portion of the one or more power supply hydraulic lines. Furthermore, the hydraulic circuit may include a fourth valve that may be in fluid communication with at least a portion of the one or more power supply hydraulic lines, at least a portion of the Line A of the motor or pump and at least a portion of the line B of the motor or pump.

According to any of the previous aspects of the disclosure, the hydraulic circuit may include a ninth valve that may be in fluid communication with at least a portion of the one or more power supply hydraulic lines by a first ninth valve hydraulic line. Additionally, the hydraulic circuit may include an eighth valve that may be in fluid communication with at least a portion of the one or more service brake hydraulic lines and at least a portion of the one or more APB supply hydraulic lines. At least a portion of the eighth valve may be in fluid communication with at least a portion of the ninth valve by a second ninth valve hydraulic line. Furthermore, the hydraulic circuit may include a tenth valve that may be in fluid communication with at least a portion of the one or more power supply hydraulic lines. At least a portion of the tenth valve may be in fluid communication with at least a portion of the second ninth valve hydraulic line by a first tenth valve hydraulic line and at least a portion of the tenth valve may be in fluid communication with at least a portion of the eighth valve by a second tenth valve hydraulic line. Still further, the hydraulic circuit may include the use of an eleventh valve that may be in fluid communication with at least a portion of the one or more power supply hydraulic lines, the line A of the motor or pump and the line B of the motor or pump. Still even further, the hydraulic circuit may include a third valve that may be in fluid communication with at least a portion of the one or more power supply hydraulic lines and is interposed between the tenth valve and the eleventh valve on the one or more power supply hydraulic lines.

According to any of the previous aspects of the disclosure, the hydraulic circuit may include a ninth valve that may be in fluid communication with at least a portion of the one or more power supply hydraulic lines by a first ninth valve hydraulic line. Additionally, the hydraulic circuit may include an eighth valve that may be in fluid communication with at least a portion of the one or more service brake hydraulic lines and at least a portion of the one or more APB supply hydraulic lines. At least a portion of the eighth valve may be in fluid communication with at least a portion of the ninth valve by a second ninth valve hydraulic line. Furthermore, the hydraulic circuit may include a twelfth valve that may be in fluid communication with at least a portion of the one or more power supply hydraulic lines. At least a portion of the twelfth valve may be in fluid communication with at least a portion of the second ninth valve hydraulic line by a first twelfth valve hydraulic line. Additionally, at least a portion of the twelfth valve may be in fluid communication with at least a portion of the one or more service brake hydraulic lines and the one or more brake pressure sensor hydraulic lines by a second twelfth valve hydraulic line. Still further, the hydraulic circuit may include an eleventh valve that may be in fluid communication with at least a portion of the one or more power supply hydraulic lines, the line A of the motor or pump and the line B of the motor or pump. Still even further, the hydraulic circuit may include a third valve that may be in fluid communication with at least a portion of the one or more power supply hydraulic lines and is interposed between the twelfth valve and the eleventh valve on the one or more power supply hydraulic lines.

According to any of the previous aspects of the disclosure, the hydraulic circuit may include one or more pilot hydraulic lines and a ninth valve that may be in fluid communication with at least a portion of the one or more pilot hydraulic lines. Additionally, the hydraulic circuit may include an eighth valve that may be in fluid communication with at least a portion of the one or more service brake hydraulic lines, at least a portion of the one or more APB supply hydraulic lines and at least a portion of the one or more pilot hydraulic lines. Furthermore, the hydraulic circuit may include a thirteenth valve that may be in fluid communication with at least a portion of the one or more power supply hydraulic lines. At least a portion of the thirteenth valve may be in fluid communication with at least a portion of the one or more pilot hydraulic lines by a first thirteenth valve hydraulic line. Still further, the hydraulic circuit may include an eleventh valve that may be in fluid communication with at least a portion of the one or more power supply hydraulic lines, the line A of the motor or pump and the line B of the motor or pump. The eleventh valve may be interposed between the thirteenth valve and the motor or pump on the one or more power supply hydraulic lines.

According to any of the previous aspects of the disclosure, the hydraulic circuit may include a closed hydraulic transmission having a transmission. The transmission may have a motor that is operably connected to at least a portion of a third motor or pump with a first line and a second line. At least a portion of the first line of the third motor or pump may be in fluid communication with at least a portion of the line B of the pump or motor and at least a portion of the second line of the third motor or pump may be in fluid communication with at least a portion of the line A of the motor or pump. The hydraulic circuit may include an intermediate line that may be in fluid communication with at least a portion of the line A of the motor or pump and the line B of the motor or pump. The intermediate line may be interposed between the third motor or pump and the motor or pump of the hydraulic circuit. Additionally, the hydraulic circuit may include a fourth motor or pump that may be in fluid communication with at least a portion of the intermediate line by a first line of the fourth motor or pump. Furthermore, the hydraulic circuit may include a sixteenth valve that may be in fluid communication with at least a portion of the first line of the fourth motor or pump. Still further, the hydraulic circuit may include a first intermediate line check valve that may be in fluid communication with the intermediate line at a point between where the intermediate line is fluidly connected to the first line of the fourth motor and the line B of the motor or pump. Still even further the hydraulic circuit may include a second intermediate line check valve. At least a portion of the second intermediate line check valve may be in fluid communication with the intermediate line at a point between where the intermediate line is fluidly connected to the first line of the fourth motor and the line A of the motor or pump.

According to any of the previous aspects of the disclosure, the hydraulic circuit may include a load sensing circuit having a motor that is operably connected to at least a portion of a fifth motor or pump with a first line and a second line. The fifth motor or pump may be electronically controlled by one or more hydraulic pilots that are in fluid communication with at least a portion of one or more load sensing lines and at least a portion of the second line of the fifth motor or pump. Additionally, the hydraulic circuit may include a braking valve circuit including a seventeenth valve, an eighteenth valve, a nineteenth valve line, a twentieth valve line, a nineteenth valve and/or a twentieth valve. At least a portion of the seventeenth valve may be in fluid communication with at least a portion of the line B of the motor or pump and at least a portion of the eighteenth valve may be in fluid communication with at least a portion of the line A of the motor or pump. Additionally, at least a portion of the nineteenth valve line may be in fluid communication with at least a portion of the line B of the motor or pump at a point between the seventeenth valve and the motor or pump. Furthermore, the nineteenth valve may be in fluid communication with at least a portion of the nineteenth valve line and at least a portion of the twentieth valve line may be in fluid communication with at least a portion of the line A of the motor or pump at a point between the motor or pump and the eighteenth valve. Furthermore, at least a portion of the twentieth valve may be in fluid communication with at least a portion of the twentieth valve line. Still further, the hydraulic circuit may include a proportional distributor that may be in fluid communication with at least a portion of the first line of said fifth motor or pump, the one or more load sensing lines, the nineteenth valve line, the twentieth valve line, the line A of the motor or pump and/or the line B of the motor or pump.

According to any of the previous aspects of the disclosure, the hydraulic circuit may include a sixth motor or pump that may be controlled by one or more hydraulic pilots that may be in fluid communication with at least a portion of one or more load sensing lines and at least a portion of said sixth motor or pump. Additionally, the hydraulic circuit may include a twenty-first valve that may be in fluid communication with at least a portion of an output line of the sixth motor or pump and the one or more service brake hydraulic lines. Furthermore, the hydraulic circuit may include a twenty-eighth valve that may be in fluid communication with at least a portion of the one or more load sensing lines, at least a portion of one or more first twenty-eighth valve lines and at least a portion of one or more second twenty-eighth valve lines. At least a portion of an end of the one or more first twenty-eighth valve lines, opposite the twenty-eighth valve, may be in fluid communication with at least a portion of the twenty-first valve and/or the one or more service brake hydraulic lines. Additionally, at least a portion of an end of the one or more second twenty-eighth valve lines, opposite the twenty-eighth valve, may be in fluid communication with at least a portion of the one or more power supply hydraulic lines. Still further, the hydraulic circuit may include a twenty-fourth valve that may be in fluid communication with at least a portion of the one or more parking brake hydraulic lines. Still even further, the hydraulic circuit may include a twenty-fifth valve that may be in fluid communication with at least a portion of the one or more parking brake hydraulic lines at a point between the twenty-fourth valve and the one or more parking brake assemblies on the one or more parking brake hydraulic lines. The hydraulic circuit may include a twenty-third valve that may be in fluid communication with at least a portion of the one or more service brake hydraulic lines and a second valve that may be in fluid communication with at least a portion of the one or more service brake hydraulic lines at a point between the one or more service brake assemblies and the twenty-third valve on the one or more service brake hydraulic lines. Additionally, the hydraulic circuit may include a twelfth valve that may be in fluid communication with at least a portion of the one or more power supply hydraulic lines and an eleventh valve that may be in fluid communication with at least a portion of the one or more power supply hydraulic lines, the line A of the motor or pump and the line B of the motor or pump. Furthermore, the hydraulic circuit may include a third valve may be in fluid communication with at least a portion of the one or more power supply hydraulic lines at a point between the eleventh valve and the twelfth valve on the one or more power supply hydraulic lines. Still further, the hydraulic circuit may include an adaptive park braking system supply circuit that may be in fluid communication with at least a portion of the second valve, the twenty-third valve, the twelfth valve and/or the second valve.

According to any of the previous aspects of the disclosure, the hydraulic circuit may include a twenty-fifth valve that may be in fluid communication with at least a portion of the one or more parking brake hydraulic lines and a second valve that may be in fluid communication with at least a portion of the one or more service brake hydraulic lines. Additionally, the hydraulic circuit may include a thirteenth valve that may be in fluid communication with at least a portion of the one or more power supply hydraulic lines and an eleventh valve that may be in fluid communication with at least a portion of the one or more power supply hydraulic lines, the line A of the motor or pump and the line B of the motor or pump. Furthermore, the hydraulic circuit may include a twenty-seventh valve that may be in fluid communication with at least a portion of the one or more power supply hydraulic lines at a point between the thirteenth valve and the eleventh valve on the one or more power supply hydraulic lines. Still further, the hydraulic circuit may include an adaptive park braking system supply circuit that may be in fluid communication with at least a portion of the twenty-fifth valve, the second valve and the thirteenth valve.

According to any of the previous aspects of the disclosure, the first valve may be an electronically controlled 2-position 3-way valve, the second valve may be an electronically controlled 2-position 3-way valve, the third valve may be a pressure reducing or pressure relieving valve, the fourth valve may be an electronically controlled discrete 2-position 4-way valve, the fifth valve may be an electronically controlled 2-position 3-way valve, the sixth valve may be a pressure reducing or pressure relieving valve, the seventh valve may be a pressure reducing or pressure relieving valve, the eighth valve may be an electronically controlled 2-position 3-way valve, the ninth valve may be an electronically controlled 2-position 3-way valve, the tenth valve may be a hydraulically controlled 2-position 2-way valve, the eleventh valve may be an electronically controlled 3-position 4-way valve, the twelfth valve may be a hydraulically controlled 2-position 2-way valve, the thirteenth valve may be a hydraulically controlled 2-position 2-way valve, the fourteenth valve may be a pressure reducing or pressure relieving valve, the fifteenth valve may be a pressure reducing or pressure relieving valve, the sixteenth valve may be a pressure reducing or pressure relieving valve, the seventeenth valve may be a pressure reducing or pressure relieving valve, the eighteenth valve may be a pressure reducing or pressure relieving valve, the nineteenth valve may be a one-way check valve, the twentieth valve may be a one-way check valve, the twenty-first valve may be a 2-position 3-way priority valve, the twenty-third valve may be a manually controlled pressure reducing or pressure relieving valve, the twenty-fourth valve may be an electronically controlled 2-position 3-way valve, the twenty-fifth valve may be a 2-position 3-way valve, the twenty-seventh valve may be a hydraulically controlled a 2-position 3-way valve, and/or the twenty-eighth valve may be a shuttle valve.

According to any of the previous aspects of the disclosure, the motor or pump may be a fixed displacement motor or a variable displacement motor, the second motor or pump may be a variable displacement pump, the third motor or pump may be a bi-directional variable displacement hydraulic pump, the fourth motor or pump may be a boosting motor or pump, the fifth motor or pump may be a variable displacement motor, and/or the sixth motor or pump may be a load sending variable displacement pump.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION OF THE DISCLOSURE

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

It is within the scope of this disclosure, and as a non-limiting example, that the adaptive park braking system hydraulic circuit disclosed herein may be used in automotive, off-road vehicle, all-terrain vehicle, construction, structural, marine, aerospace, locomotive, military, machinery, robotic and/or consumer product applications. Additionally, as a non-limiting example, the adaptive park braking system hydraulic circuit disclosed herein may also be used in construction equipment, passenger vehicle, electric vehicle, hybrid vehicle, commercial vehicle, autonomous vehicles, semi-autonomous vehicles and/or heavy vehicle applications.

Figure 1:
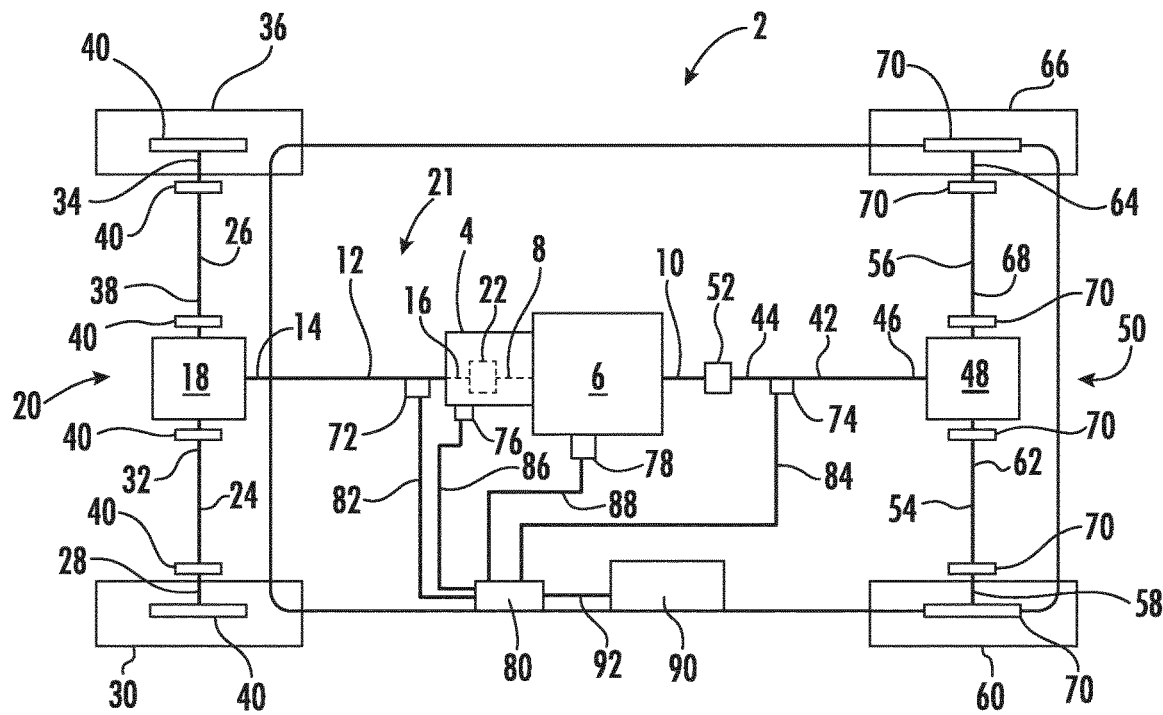
FIG. 1 is a schematic top plan view of a vehicle according to an embodiment of the disclosure.
Figure 2A:
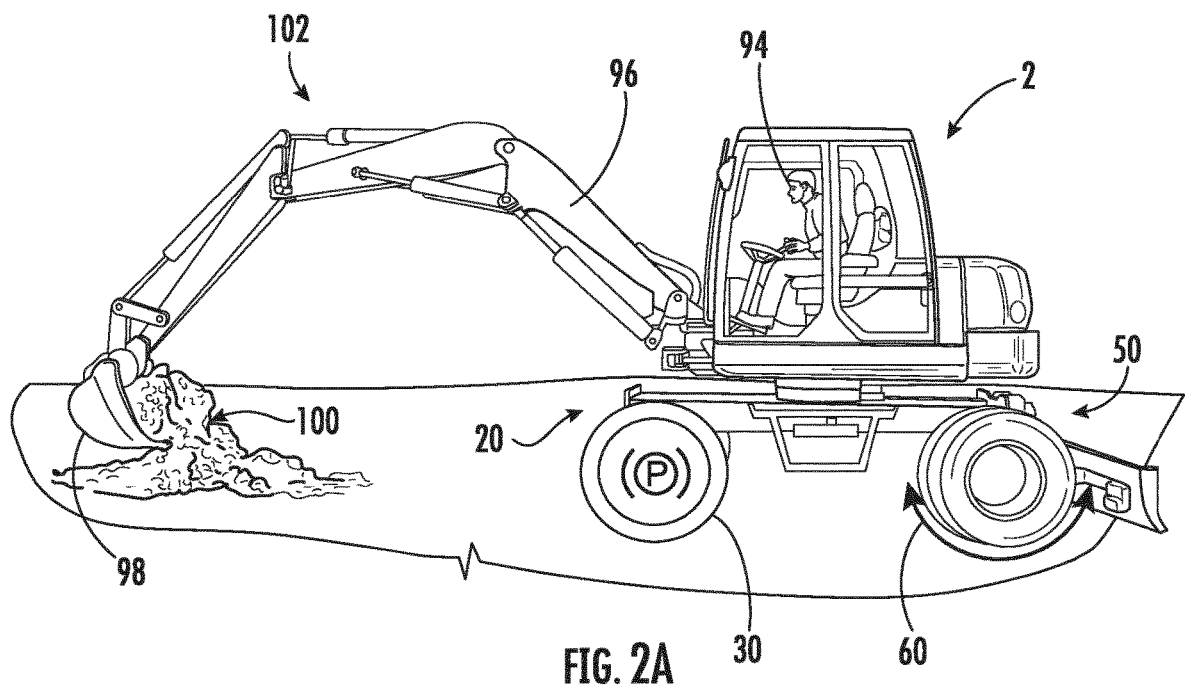
FIG. 2 is a side-view of a vehicle having an adaptive park braking system hydraulic circuit according to an embodiment of the disclosure.
FIG. 2B is a flow chart illustrating the method of operating the adaptive park braking system according to an embodiment of the disclosure.
Figure 2B:
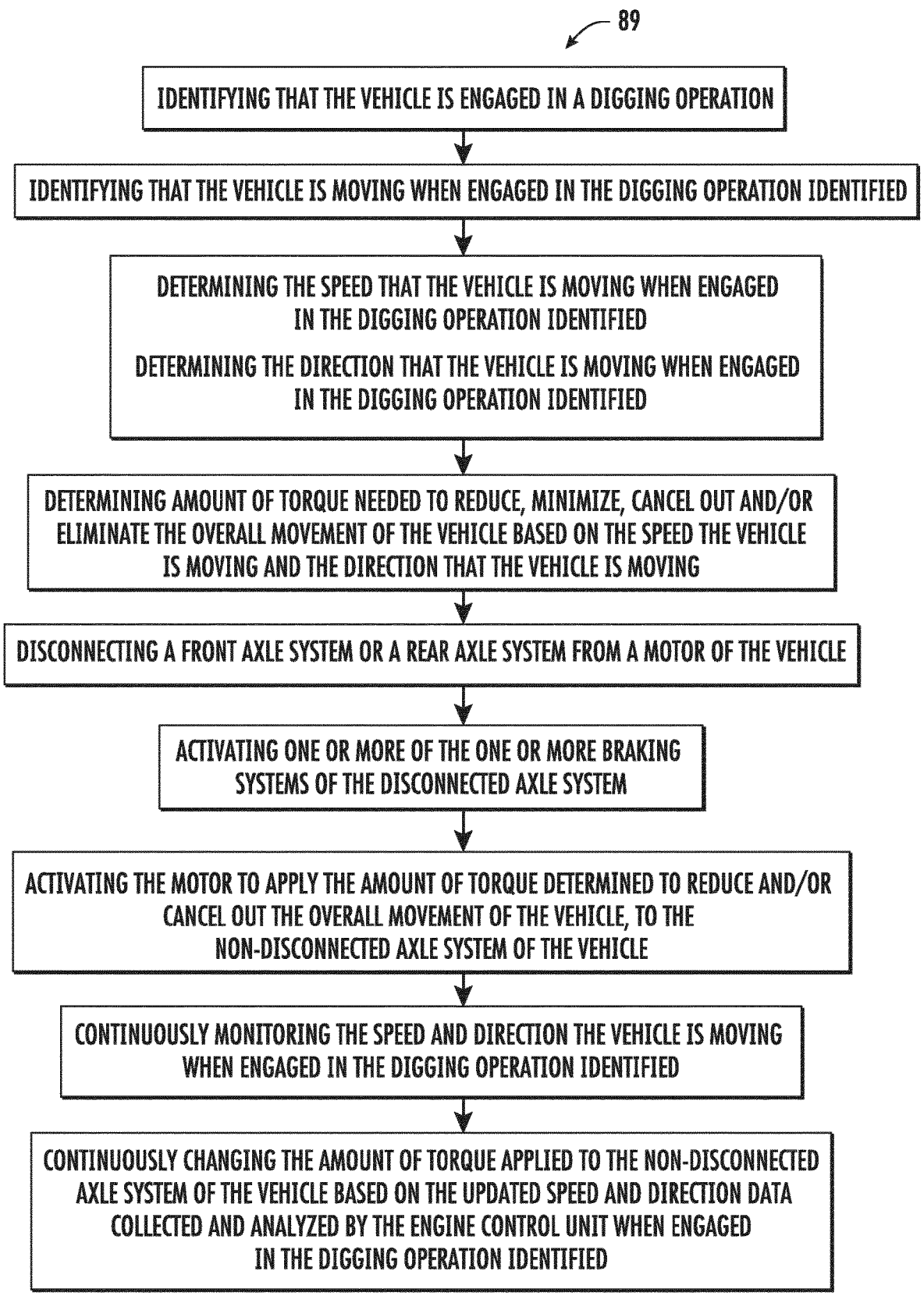

FIGS. 1-2B illustrate a vehicle 2 having an adaptive park braking system hydraulic circuit 90 and a method of operating an adaptive park braking system 89 according to an embodiment of the disclosure. The vehicle 2 has a motor 4 that is drivingly connected to an end of a transmission 6 having a first transmission output shaft 8 and a second transmission output shaft 10. As illustrated in FIG. 1 of the disclosure, the first transmission output shaft 8 and the second transmission output shaft 10 are disposed on opposite ends of the transmission 6. The transmission 6 is a power management system which provides controlled application of the rotational power generated by the motor 4 by means of a gear box. As a non-limiting example the vehicle 2 is a piece of excavation equipment, an excavator and/or a backhoe. Additionally, as a non-limiting example, the motor 4 is a hydraulic motor, an internal combustion engine, an external combustion engine, an electric motor and/or a heat engine.

A first shaft 12 having a first end portion 14 and a second end portion 16 extends from the first transmission output shaft 8 to a front axle differential 18 of a front axle system 20. As a result, the first shaft 12 drivingly connects the transmission 6 to the front axle system 20 of the vehicle 2. In accordance with an embodiment of the disclosure and as a non-limiting example, the first shaft 12 is a propeller shaft, a drive shaft, a cardan shaft, a double cardan shaft, a universal joint shaft, a universal coupling shaft, a Hooke's joint shaft or any other shaft in a vehicle drive-train 21 that is used to transmit the rotational energy generated by the motor 4 to the drive wheel(s) of the vehicle 2.

The second end portion 16 of the first shaft 12 is drivingly connected to an end of the first transmission output shaft 8 opposite the transmission 6. According to an embodiment of the disclosure and as a non-limiting example, the second end portion 16 of the first shaft 12 is drivingly connected to the end of the first transmission output shaft 8, opposite the transmission 6, by using one or more of the following components (not shown), a constant velocity joint, a universal coupling, a U-joint, a cardan joint, a double cardan joint, a Spicer joint, a Hardy Spicer Joint or a Hooke's joint.

In accordance with an alternative embodiment of the disclosure and as a non-limiting example, the second end portion 16 of the first shaft 12 may be drivingly connected to the end of the first transmission output shaft 8, opposite the transmission 6, by using a front axle disconnect system 22. The front axle disconnect system 22 selectively connects and disconnects the front axle system 20 from the motor 4 and the transmission 6 of the vehicle 2. When the front axle disconnect system 20 is in a disengaged (or disconnected) position (not shown), the first transmission output shaft 8 is not drivingly connected to the first shaft 12. As a result, the rotational power generated by the motor 4 is not transmitted to the wheel(s) of the front axle system 20 of the vehicle 2. When the front axle disconnect system 22 is in an engaged (or connected) position (not shown), the first transmission output shaft 8 is drivingly connected to the first shaft 12. As a result, the rotational power generated by the motor 4 is transmitted to the wheel(s) of the front axle system 20 of the vehicle 2. As a non-limiting example, the front axle disconnect system 22 may be a radial dog clutch assembly or an axial dog clutch system.

In order to selectively transition the front axle disconnect system 22 between the engage and disengage (connect and disconnect) positions (not shown), at least a portion of the front axle disconnect system 22 is connected to a front axle disconnect actuation assembly (not shown). Upon activation of the front axle disconnect actuation assembly (not shown) the front axle disconnect system 22 can selectively transition between the engage and disengage (connect and disconnect) positions (not shown). It is within the scope of this disclosure and as a non-limiting example that the front axle disconnect actuation assembly (not shown) may be an actuator assembly, a linear actuator assembly, a hydraulic piston assembly, a pneumatic piston assembly, a roller screw actuation assembly, an electro-mechanical actuator and/or an electro-magnetic actuator.

As illustrated in FIG. 1 of the disclosure, the first end portion 14 of the first shaft 12 is drivingly connected at the front axle differential 18 of the front axle system 20. According to an embodiment of the disclosure and as a non-limiting example, the first end portion 14 of the first shaft 12 is drivingly connected to the front axle differential 18 by using one or more of the following components (not shown), a universal joint assembly, a constant velocity joint assembly, a drive shaft, a stub shaft, a coupling shaft, a front axle system input shaft, a pinion gear shaft, a differential pinion gear shaft and/or a front axle differential input shaft. The rotational power is transmitted through the front axle system 20 as described in more detail below.

The front axle system 20 includes a first front axle half shaft 24 and a second front axle half shaft 26. The first front axle half shaft 24 extends substantially perpendicular to the first shaft 12 of the vehicle 2. A first end portion 28 of the first front axle half shaft 24 is drivingly connected to a first front axle wheel assembly 30 and a second end portion 32 of the first front axle half shaft 24 is drivingly connected to a side of the front axle differential 18. As a non-limiting example, the second end portion 32 of the first front axle half shaft 24 is drivingly connected to a front axle differential side gear, a separate stub shaft, a separate coupling shaft, a first front axle half shaft axle disconnect system, a first front axle differential output shaft and/or a shaft that is formed as part of a front axle differential side gear.

Extending substantially perpendicularly with the first shaft 12 is the second front axle half shaft 26 of the front axle system 20 of the vehicle 2. A first end portion 34 of the second front axle half shaft 26 is drivingly connected to a second front axle wheel assembly 36 and a second end portion 38 of the second front axle half shaft 26 is drivingly connected to a side of the front axle differential 18 opposite the first front axle half shaft 24. As a non-limiting example, the second end portion 38 of the second front axle half shaft 26 is drivingly connected to a front axle differential side gear, a separate stub shaft, a separate coupling shaft, a second front axle half shaft axle disconnect system, a second front axle differential output shaft and/or a shaft that is formed as part of a front axle differential side gear.

In accordance with the embodiment of the disclosure illustrated in FIG. 1 and as a non-limiting example, the front axle system 20 of the vehicle 2 may include the use of one or more front axle braking systems 40. The one or more front axle braking systems 40 are a mechanical device that inhibit the transmission of rotational energy or torque from the motor 4 to the first and/or second wheel assemblies 30 and/or 36. Additionally, it is within the scope of this disclosure, that the one or more front axle braking systems 40 may allow a variable amount rotational energy or torque to be transferred to the first and/or second wheel assemblies 30 and/or 36 of the vehicle 2. As a non-limiting example the one or more front axle braking systems 40 may be a part of the first and/or second wheel assemblies 30 and/or 36, located adjacent to and inboard from the first and/or second wheel assemblies 30 and/or 36, located on the second end portion 32 of the first front axle half shaft 24 and/or located on the second end portion 38 of the second rear axle half shaft 26 of the vehicle 2. Additionally, as a non-limiting example, the one or more front axle braking systems 40 may be a disk brake system, drum brake system and/or a friction clutch system.

A second shaft 42 having a first end portion 44 and a second end portion 46 extends from the second transmission output shaft 10 to a rear axle differential 48 of a rear axle system 50 of the vehicle 2. As a result, the second shaft 42 drivingly connects the transmission 6 to the rear axle system 50 of the vehicle 2. In accordance with an embodiment of the disclosure and as a non-limiting example, the second shaft 42 may be a propeller shaft, a drive shaft, a cardan shaft, a double cardan shaft, a universal joint shaft, a universal coupling shaft, a Hooke's joint shaft or any other shaft in the vehicle drive-train 21 that is used to transmit the rotational energy generated by the motor 4 to the drive wheel(s) of the vehicle 2.

The first end portion 44 of the second shaft 42 is drivingly connected to an end of the second transmission output shaft 10 opposite the transmission 6. According to an embodiment of the disclosure and as a non-limiting example, the first end portion 44 of the second shaft 42 is drivingly connected to the end of the second transmission output shaft 10, opposite the transmission 6, by using one or more of the following components (not shown), a constant velocity joint, a universal coupling, a U-joint, a cardan joint, a double cardan joint, a Spicer joint, a Hardy Spicer Joint or a Hooke's joint.

In accordance with an alternative embodiment of the disclosure and as a non-limiting example, the first end portion 44 of the second shaft 42 may be drivingly connected to the end of the second transmission output shaft 10, opposite the transmission 6, by using a rear axle disconnect system 52. The rear axle disconnect system 52 selectively connects and disconnects the rear axle system 50 from the motor 4 and the transmission 6 of the vehicle 2. When the rear axle disconnect system 52 is in a disengaged (or disconnected) position (not shown), the second transmission output shaft 10 is not drivingly connected to the second shaft 42. As a result, the rotational power generated by the motor 4 is not transmitted to the wheel(s) of the rea axle system 50 of the vehicle 2. When the rear axle disconnect system 52 is in an engaged (or connected) position (not shown), the second transmission output shaft 10 is drivingly connected to the second shaft 42. As a result, the rotational power generated by the motor 4 is transmitted to the wheel(s) of the rear axle system 50 of the vehicle 2. As a non-limiting example, the rear axle disconnect system 52 may be a radial dog clutch assembly or an axial dog clutch system.

In order to selectively transition the rear axle disconnect system 52 between the engage and disengage (connect and disconnect) positions (not shown), at least a portion of the rear axle disconnect system 52 is connected to a rear axle disconnect actuation assembly (not shown). Upon activation of the rear axle disconnect actuation assembly (not shown) the rear axle disconnect system 52 can selectively transition between the engage and disengage (connect and disconnect) positions (not shown). It is within the scope of this disclosure and as a non-limiting example that the rear axle disconnect actuation assembly (not shown) may be an actuator assembly, a linear actuator assembly, a hydraulic piston assembly, a pneumatic piston assembly, a roller screw actuation assembly, an electro-mechanical actuator and/or an electro-magnetic actuator.

As illustrated in FIG. 1 of the disclosure, the second end portion 46 of the second shaft 42 is drivingly connected at the rear axle differential 48 of the rear axle system 50. According to an embodiment of the disclosure and as a non-limiting example, the second end portion 46 of the second shaft 42 is drivingly connected to the rear axle differential 48 by using one or more of the following components (not shown), a universal joint assembly, a constant velocity joint assembly, a drive shaft, a stub shaft, a coupling shaft, a rear axle system input shaft, a pinion gear shaft, a differential pinion gear shaft and/or a rear axle differential input shaft. The rotational power is transmitted through the rear axle system 50 as described in more detail below.

The rear axle system 50 includes a first rear axle half shaft 54 and a second rear axle half shaft 56. The first rear axle half shaft 54 extends substantially perpendicular to the second shaft 42 of the vehicle 2. A first end portion 58 of the first rear axle half shaft 54 is drivingly connected to a first rear axle wheel assembly 60 and a second end portion 62 of the first rear axle half shaft 54 is drivingly connected to a side of the rear axle differential 48. As a non-limiting example, the second end portion 62 of the first rear axle half shaft 54 is drivingly connected to a rear axle differential side gear, a separate stub shaft, a separate coupling shaft, a first rear axle half shaft axle disconnect system, a first rear axle differential output shaft and/or a shaft that is formed as part of a rear axle differential side gear.

Extending substantially perpendicularly with the second shaft 42 is the second rear axle half shaft 56 of the rear axle system 50 of the vehicle 2. A first end portion 64 of the second rear axle half shaft 56 is drivingly connected to a second rear axle wheel assembly 66 and a second end portion 68 of the second rear axle half shaft 56 is drivingly connected to a side of the rear axle differential 48 opposite the first front axle half shaft 54. As a non-limiting example, the second end portion 68 of the second rear axle half shaft 56 is drivingly connected to a rear axle differential side gear, a separate stub shaft, a separate coupling shaft, a second rear axle half shaft axle disconnect system, a second rear axle differential output shaft and/or a shaft that is formed as part of a rear axle differential side gear.

In accordance with the embodiment of the disclosure illustrated in FIG. 1 and as a non-limiting example, the rear axle system 50 of the vehicle 2 may include the use of one or more rear axle braking systems 70. The one or more rear axle braking systems 70 of the rear axle system 50 are a mechanical device that inhibit the transmission of rotational energy or torque from the motor 4 to the first and/or second wheel assemblies 60 and/or 66. Additionally, it is within the scope of this disclosure, that the one or more rear axle braking systems 70 of the rear axle system 50 or allow a variable amount rotational energy or torque to be transferred to the first and/or second wheel assemblies 60 and/or 66 of the vehicle 2. As a non-limiting example the one or more rear axle braking systems 70 may be a part of the first and/or second wheel assemblies 60 and/or 66, located adjacent to and inboard from the first and/or second wheel assemblies 60 and/or 66, located on the second end portion 62 of the first rear axle half shaft 54 and/or located on the second end portion 68 of the second rear axle half shaft 56 of the vehicle 2. Additionally, as a non-limiting example, the one or more rear axle braking systems 70 of the rear axle system 50 may be a disk brake system, drum brake system and/or a friction clutch system.

The vehicle 2 may further include the use of a first sensor 72, a second sensor 74, a third sensor 76 and/or a fourth sensor 78 that are in communication with an electronic control unit 80 having one or more data processors (not shown). As illustrated in FIG. 1 of the disclosure, the first, second, third and fourth sensors 72, 74, 76 and/or 78 are in communication with the electronic control unit 80 of the vehicle 2 by a first data-link 82, a second data-link 84, a third data-link 86 and/or a fourth data-link 88 respectively. As a non-limiting example, the first, second, third and fourth data-links 82, 84, 86 and 88 provide an electrical and/or fiber optic connection which facilitates the transmission of data from the first, second, third and/or fourth sensors 72, 74, 76 and/or 78 to the electronic control unit 80 of the vehicle 2. In accordance with an alternative embodiment of the disclosure (not shown), the first sensor 72, the second sensor 74, the third sensor 76 and/or the fourth sensor 78 may be put in wireless communication with the electronic control unit 80 of the vehicle 2. It is within the scope of this disclosure and as a non-limiting example that the wireless connection between the first, second, third and/or fourth sensors 72, 74, 76 and/or 78 and the electronic control unit 80 may be a Bluetooth connection, Wi-Fi connection, electromagnetic wave connection, cellular connection and/or a radio connection.

It is within the scope of this disclosure and as a non-limiting example that the first sensor 72 and/or the second sensor 74 may be a speed sensor. As illustrated in FIG. 1 of the disclosure and as a non-limiting example, the first sensor 72 is operably configured to collect data relating to the rotational speed of the first shaft 12 of the vehicle 2 and the second sensor 74 is operably configured to collect data relating to the speed of the second shaft 42 of the vehicle 2. The data collected by the first and/or second sensors 72 and/or 74 is communicated to the electronic control unit 80 for processing. According to an embodiment of the disclosure and as a non-limiting example, the first and/or second sensors 72 and/or 74 may continuously transmit data to the electronic control unit 80 of the vehicle 2. In accordance with an alternative embodiment of the disclosure and as a non-limiting example, the first and/or second sensors 72 and/or 74 may be configured to send the data collected at pre-determined intervals, upon the occurrence of a pre-determined event and/or upon an instruction given by an operator 94 of the vehicle 2.

The first and/or second sensors 72 and/or 74 of the vehicle 2 may be used to first determine if the vehicle 2 is moving and second determine how fast the vehicle 2 is moving. The electronic control unit 80 determines if the vehicle 2 is moving by analyzing the data collected from the first and/or the second sensors 72 and/or 74 in order to determine if the first and/or the second shaft 12 and/or 42 is rotating. In accordance with an embodiment of the disclosure and as a non-limiting example, the first and/or second sensors 72 and/or 74 may additionally be configured to collect data relating to the rotational direction of the first and/or second sensors 72 and/or 74. All of this data will allow the electronic control unit 80 of the vehicle 2 to determine if the vehicle 2 is moving, how fast the vehicle 2 is moving and in which direction the vehicle 2 is moving.

As illustrated in FIG. 1 of the disclosure, the third sensor 76 is connected to the motor 4 of the vehicle 2 and the fourth sensor 78 is connected to the transmission 6 of the vehicle 2. The fourth sensor 78 is operably configured to collect data relating to the amount torque transferred through the gears of the transmission 6 to the first and second transmission output shafts 8 and 10 of the vehicle 2. Depending on the amount of torque that needs to be delivered to the first and/or second transmission output shafts 8 and/or 10 at a given time, the amount of torque generated by the motor 4 is changed in real-time. According to an embodiment of the disclosure and as a non-limiting example, the third sensor 76 may be a torque sensor that is operably configured to collect data relating to the amount of torque generated by the motor 4 of the vehicle 2. In accordance with an alternative embodiment of the disclosure and as a non-limiting example, the third sensor 76 may be a pressure sensor that is operably configured to collect data relating to the amount of pressure within the motor 4 of the vehicle 2. In accordance with this embodiment of the disclosure, the electronic control unit 80 analyzes the data collected from the third sensor 76 to determine the amount of torque generated by the motor 4. The amount of torque generated by the motor 4 of the vehicle 2 is determined by:

$$T = \alpha \cdot \Delta P \cdot \frac{V_{max} \cdot \eta_m}{20 \cdot \pi}$$

wherein $\alpha$ is the displacement of the motor 4, $\Delta P$ is the pressure difference between the hydraulic parts, $V_{max}$ is the maximum displacement of the motor 4 and $\eta_m$ is the hydro-mechanical efficiency of the motor 4 of the vehicle 2.

Additionally, as illustrated in FIG. 1 of the disclosure, the vehicle 2 further includes an adaptive park braking hydraulic circuit 90. The adaptive park braking hydraulic circuit 90 is in electrical communication with the electronic control unit 80 by using one or more hydraulic circuit data-links 92. The adaptive park braking hydraulic circuit 90 schematically illustrated in FIG. 1 of the disclosure will be described in more detail later in this document.

As illustrated in FIG. 2, when the vehicle 2 is in operation, the vehicle 2 will experience an amount of unwanted movement, or oscillations, that are transmitted through the vehicle drive-train 21 and to the operator 94 of the vehicle 2. As previously discussed, the amount of unwanted movement, or oscillation, experienced by the vehicle 2 occurs as a result of one or more mechanical backlashes within the components of the drive-train 21 of the vehicle 2. These mechanical backlashes reduce the overall life and durability of the various components of the drive-train 21 of the vehicle 2, reduces the overall comfort experienced by the operator 94 and generates one or more pits under one or more of the wheels 30, 36, 60 and/or 66 of the vehicle 2 thereby reducing the overall stability of the vehicle 2.

According to the embodiment of the disclosure and as a non-limiting example, an amount of unwanted movement is transmitted through the drive-train 21 of the vehicle 2 and to the operator 94 as a result of the vehicle 2 being engaged in a digging operation. The amount of unwanted movement transmitted through the drive-train 21 and to the operator 90 is, at least in part, as a result of the boom arm 96 moving and/or as a result of an amount of force generated when a bucket 98 of the boom arm 96 interacts with one or more materials 100 being moved. Depending on the amount and type of the one or more materials 100 being moved, the amount of unwanted movement that is transmitted through the drive-train 21 and to the operator 94 of the vehicle 2 will vary. As a non-limiting example, the one or more materials 100 may be an amount of dirt, sand, soil, rock, minerals, concrete and/or asphalt materials.

As illustrated in FIG. 2B of the disclosure and as a non-limiting example, the method of operating the adaptive park braking system 89 utilizes the adaptive park braking hydraulic circuit 90 according to an embodiment of the disclosure first utilizes the electronic control unit 80 to determine or identify whether or not the vehicle 2 is engaged in a digging operation 102. The electronic control unit 80 then utilizes the first sensor 72 and/or the second sensor 74 in order to determine or identify if the vehicle 2 is moving, if the first shaft 12 is rotating, if the second shaft 42 is rotating, in what direction the vehicle 2 is moving and how fast the vehicle 2 is moving when the vehicle 2 is engaged in the digging operation 102.

Based on the speed and/or direction that the vehicle 2 is moving when engages in the digging operation 102 illustrated in FIG. 2, the adaptive park braking system 89 will disconnect the front axle system 20 from the rear axle system 50. This is done by sending a signal from the electronic control unit 80 to either the front axle disconnect system 22 or the rear axle disconnect system 52. The signal from the electronic control unit 80 instructs either the front axle disconnect system 22 to disconnect the front axle system 20 from the motor 4 or the signal instructs the rear axle disconnect system 52 to disconnect the rear axle system 50 from the motor 4. As a result, of this signal from the electronic control unit 80 of the vehicle 2, the vehicle 2 will be translated from a 4-wheel driving mode to a 2-wheel driving mode. It is within the scope of this disclosure that the step of disconnecting the front or rear axle system 20 or 50 from the motor 4 may occur at any time after the electronic control unit 80 identifies that the vehicle is moving while engaged in a digging operation 102.

Additionally, according to an embodiment of the disclosure and as a non-limiting example, the method of operating the adaptive park braking system 89 may further include the step of activating one or more of the one or more braking systems 40 and/or 70 of the disconnected axle system 20 or 50 of the vehicle 2. By activating or engaging the one or more of the one or more braking systems 40 and/or 70 of the disconnected axle system 20 or 50 of the vehicle 2, it will aid in preventing the transmission of the unwanted movement through the drive-train 21 when the vehicle 2 is engaged in a digging operation 102. This will limit the amount of and/or the severity of the one or more mechanical backlashes within the components of the drive-train 21 thereby increasing the overall life and durability of the components of the drive-train 21, reducing maintenance costs and increasing the overall comfort perceived by the operator 94. Additionally, this will aid in reducing and/or eliminating the occurrence of and/or eliminating the occurrence of a pit under one or more of the wheel assemblies 30, 36, 60 and/or 66 of the vehicle 2 thereby increasing the overall stability of the vehicle 2.

Furthermore, according to an embodiment of the disclosure and as a non-limiting example, the electronic control unit 80 of the vehicle 2 may be used to determine an amount of torque needed to reduce, minimize and/or eliminate the overall amount of movement of the vehicle 2 when engaged in the digging operation 102 identified or determined. It is within the scope of this disclosure and as a non-limiting example that the amount of torque needed to reduce, minimize and/or eliminate the vehicle 2 may be determined based on the speed and/or direction in which the vehicle 2 is moving, the speed and/or direction that the first shaft 12 is rotating and/or the speed and/or direction that the second shaft 42 is rotating when engaged in the digging operation 102 identified.

After an amount of torque needed to reduce, minimize, cancel out and/or eliminate the overall movement of the vehicle 2 has been determined, the motor 4 may be activated to apply the amount of torque determined to the non-disconnected axle system 20 or 50 of the vehicle 2. In this step, the electronic control unit 80 of the vehicle 2 instructs the motor 4 to apply the amount of torque determined in the opposite direction that the vehicle was determined to be moving. It is within the scope of this disclosure, that the application of the amount of torque determined by the motor 4, can occur at substantially the same time as when one or more of the one or more braking systems 40 and/or 70 are engaged or after one or more of the one or more braking systems 40 and/or 70 have been engaged. By applying the amount of torque determined, after one or more of the one or more braking systems 40 and/or 70 of the disconnected axle system 20 or 50 have been engaged, it allows the motor 4 to apply a pre-tensioning force onto the drive-line 21 of the vehicle 2. This pre-tensioning force provides a dampening force that reduces, minimizes, cancels out and/or eliminates the overall movement of the vehicle 2 when the vehicle is engaged in the digging operation 102 identified.

The method of operating the adaptive park braking system 89 may be configured to continuously monitor the speed and/or direction in which the vehicle 2 is moving, the speed and/or direction that the first shaft 12 is rotating and/or the speed and/or direction that the second shaft 42 is rotating when engaged in the digging operation 102 identified. As the speed and/or direction in which the vehicle 2 is moving, the speed and/or direction that the first shaft 12 is rotating and/or the speed and/or direction that the second shaft 42 is rotating changes while the vehicle 2 is engaged in the digging operation 102 identified, the adaptive park braking system 89 may continuously change the amount of torque that is supplied to the non-disconnected axle system by the motor 4. This will further aid in ensuring that the pre-tensioning force provided always commensurate with the speed and/or direction in which the vehicle 2 is moving, the speed and/or direction that the first shaft 12 is rotating and/or the speed and/or direction that the second shaft 42 is rotating. It is to be understood that by continuously changing the amount of torque supplied to the non-disconnected axle system by the motor 4, the dampening force will be continuously changing or updated to always be sufficient to reduce, minimize, cancel out and/or eliminate the overall movement of the vehicle 2 when engaged in the digging operation 102 identified. As a result, the method of operating the adaptive park braking system 89 further aids in ensuring that the one or more pits typically generated under one or more of the wheels 30, 36, 60 and/or 66 of the vehicle 2 are reduced, minimized and/or eliminated thereby improving the overall safety and stability of the vehicle 2 when engaged in the digging operation 102 identified.

Figure 3:
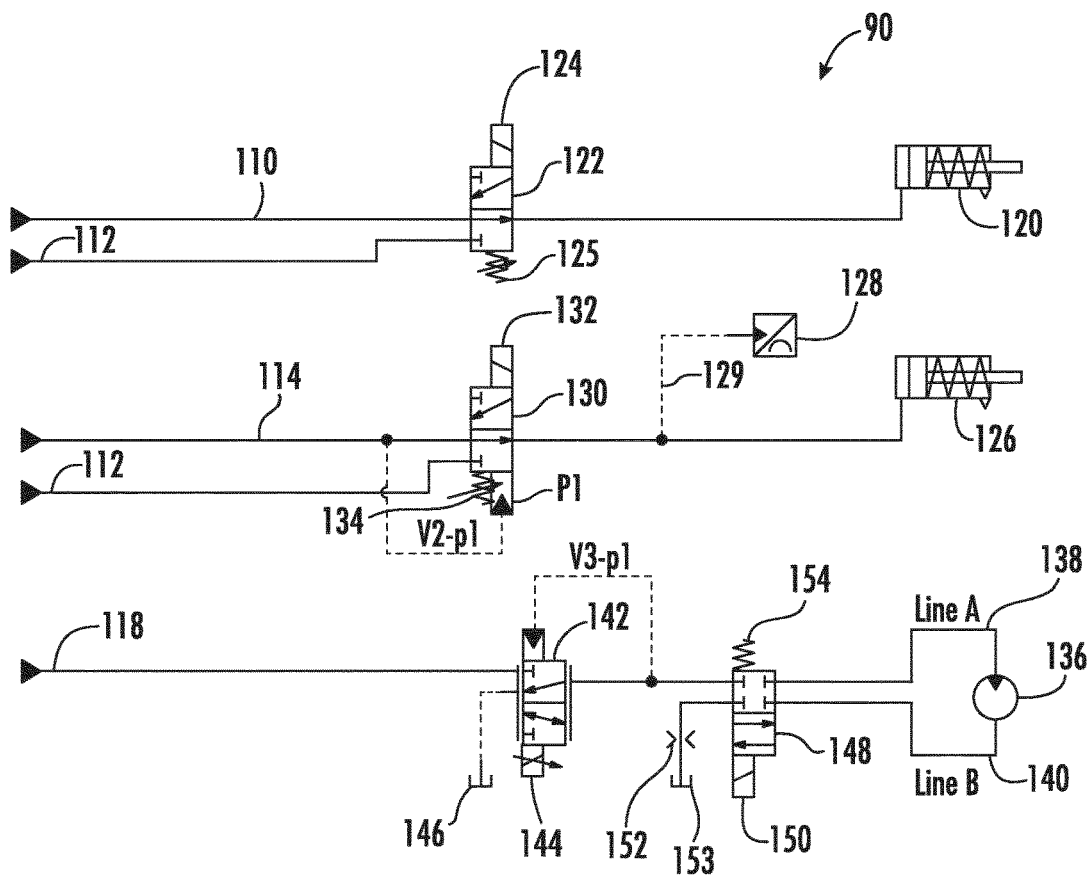
FIG. 3 is a schematic illustration of the adaptive park braking system hydraulic circuit illustrated in FIG. 1 according to an embodiment of the disclosure.
Figure 4:
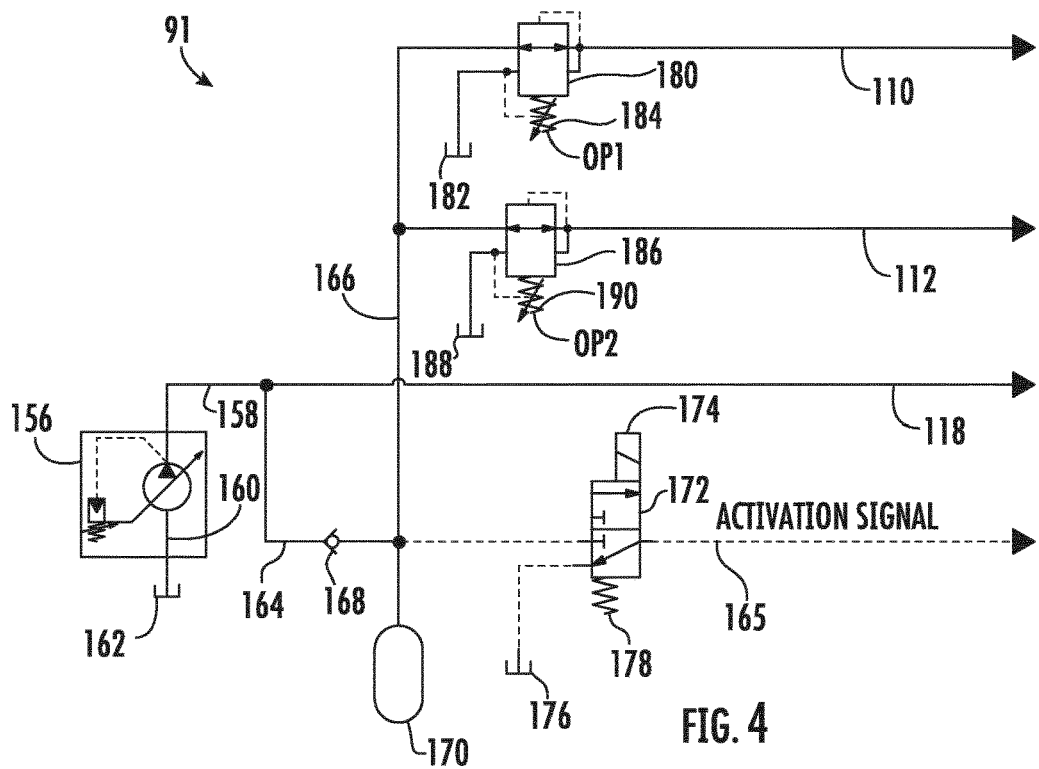
FIG. 4 is a schematic illustration of an adaptive park braking system supply circuit for the adaptive park braking system hydraulic circuit illustrated in FIGS. 1 and 3 according to an embodiment of the disclosure.

FIGS. 3 and 4 provide a schematic illustration of the adaptive park braking system hydraulic circuit 90 (hereinafter the "hydraulic circuit") illustrated in FIG. 1 and an adaptive park braking system supply circuit 91 (hereinafter the "supply circuit") according to an embodiment of the disclosure. As illustrated in FIG. 3 and as a non-limiting example, the hydraulic circuit 90 includes one or more parking brake hydraulic lines 110, one or more adaptive park brake (APB) supply hydraulic lines 112, one or more service brake hydraulic lines 114 and one or more power supply hydraulic lines 118. At least a portion of one or more parking brake assemblies 120 are in fluid communication with at least a portion of the one or more parking brake hydraulic lines 110 of the hydraulic circuit 90. It is within the scope of this disclosure and as a non-limiting example that the one or more parking brake assemblies 120 may be a one or more hand brake assemblies, one or more emergency brake assemblies, one or more e-brake assembles and/or any other type of brake assembly that can be used to keep the vehicle 2 stationary and/or can perform an emergency stop of the vehicle 2.

The one or more APB supply hydraulic lines 112 are selectively in fluid communication with the one or more parking brake hydraulic lines 110 via a first valve 122. In accordance with the embodiment of the disclosure illustrated in FIG. 3 and as a non-limiting example, the first valve 122 of the hydraulic circuit 90 of the vehicle 2 may be electronically controlled by a solenoid 124. Upon receiving an instruction from the electronic control unit 80 of the vehicle 2, the solenoid 124 will transition the first valve 122 between a first position and a second position. When the first valve 122 is in the first (non-powered) position, the one or more APB supply hydraulic lines 112 are not in fluid communication with the one or more parking brake assemblies 120 of the vehicle 2. However, when the first valve 122 is in the second (powered) position, the one or more APB supply hydraulic lines 112 are in fluid communication with the one or more parking brake assemblies 120 of the vehicle 2. As a non-limiting example, the first valve 122 of the hydraulic circuit 90 may be a 2-position 3-way valve.

As illustrated in FIG. 3 of the disclosure and as a non-limiting example, the first valve 122 may include the use of a spring 125. The spring 125 of the first valve 122 aids in transitioning the first valve 122 between the first position and the second position previously described. It is within the scope of this disclosure and as a non-limiting example that the spring 125 may be a variable spring.

One or more service brake assemblies 126 and one or more brake pressure sensors 128 may be in fluid communication with at least a portion of the one or more service brake hydraulic lines 114 of the hydraulic circuit 90 of the vehicle 2. The one or more brake pressure sensors 128 of the hydraulic circuit 90 are operable configured to measure an amount of pressure acting upon a brake cylinder (not shown) by the operator 94 of the vehicle 2. As illustrated in FIG. 3 of the disclosure, one or more brake pressure sensors 128 is in fluid communication with the one or more service brake hydraulic lines 114 and the one or more service brake assemblies 126 by using one or more brake pressure sensor hydraulic lines 129. The one or more service brake assemblies 126 may be the primary braking system for the vehicle 2 and can be selectively activated by the operator 94 of the vehicle 2 by applying an amount of pressure onto a brake pedal (not shown). Upon application of an amount of pressure onto the brake pedal (not shown) by the operator 94 of the vehicle 2, an amount of fluid pressure will be transmitted through the one or more service brake hydraulic lines 114 to one or more of the one or more braking systems 40 and/or 70 of the vehicle 2. The amount of fluid pressure applied to the one or more service brake lines 114 by the brake pedal (not shown) allows one or more of the one or more brake systems 40 and/or 70 to apply an amount of force onto the drive-line 21 of the vehicle 2 needed to slow the vehicle down and/or to stop the vehicle 2. As a non-limiting example, the one or more service brake assemblies 126 may be one or more disk brake systems, one or more drum brake systems and/or one or more friction clutch systems.

In accordance with the embodiment of the disclosure illustrated in FIG. 3 and as a non-limiting example, the one or more of the one or more APB supply hydraulic lines 112 of the hydraulic circuit 90 are selectively in fluid communication with the one or more service brake hydraulic lines 114 via a second valve 130. It is within the scope of this disclosure and as a non-limiting example that the second valve 130 of the hydraulic circuit 90 may be electronically controlled by a solenoid 132. Upon receiving an instruction from the electronic control unit 80 of the vehicle 2, the solenoid 132 will transition the second valve 130 between a first position and a second position. When the second valve 130 is in the first (non-powered) position, the one or more APB supply hydraulic lines 112 are not in fluid communication with the one or more service brake assemblies 126 of the vehicle 2. In this position the vehicle 2 preserves all of the functionality and safety features that are available in a standard vehicle 2. However, when the second valve 130 is in the second (powered) position, the one or more of the one or more APB supply hydraulic lines 112 are in fluid communication with the one or more service brake assemblies 126 of the vehicle 2. As a result, when the second valve 130 is in the second position, the one or more service brake assemblies 126 receive an amount of pressure from the one or more APB supply hydraulic lines 112 needed to hold the vehicle 2 against a pre-load generated by the motor 4. As a non-limiting example, the second valve 130 of the hydraulic circuit 90 may be a 2-position 3-way valve.

It is within the scope of this disclosure and as a non-limiting example, the second valve 130 may include the use of a spring 134. The spring 134 of the second valve 130 aids in transitioning the second valve 130 between the first position and the second position previously described. As a non-limiting example the spring 134 may be a variable spring.

In the event that the brake pedal (not shown) is actuated by the operator 94 of the vehicle 2 during operation of the adaptive park braking system, and the pressure P1 within the one or more service brake hydraulic lines 114 exceeds a pre-determined amount, the second valve 130 returns to its first (non-powered) position. As a non-limiting example, the pre-determined pressure P1 may be from approximately 10 bar to approximately 30 bar.

As illustrated in FIG. 3 of the disclosure and as a non-limiting example, a motor or pump 136 is in fluid communication with at least a portion of the one or more power supply hydraulic lines 118 of the hydraulic circuit 90. Fluidly connected to an end of the motor or pump 136 is a line A 138 of the one or more power supply hydraulic lines 118 and fluidly connected to an end of the motor or pump 136, opposite the line A 138, is a line B 140 of the one or more power supply hydraulic lines 118. It is within the scope of this disclosure and as a non-limiting example that the motor or pump 136 may be a fixed displacement motor.

Fluidly connected to at least a portion of the one or more power supply hydraulic lines 118 of the hydraulic circuit 90 is a third valve 142. As illustrated in FIG. 3 of the disclosure and as a non-limiting example, the third valve 142 provides a pressure reducing or pressure relieving function for the one or more power supply hydraulic lines 118 of the hydraulic circuit 90. As a result, the third valve 142 is able to control the amount of torque that is generated by the motor or pump 136 of the hydraulic circuit 90 by controlling the amount of fluid pressure is transmitted through the one or more power supply hydraulic lines 118 to the motor or pump 136.

In accordance with the embodiment of the disclosure illustrated in FIG. 3 and as a non-limiting example, the third valve 142 of the hydraulic circuit 90 may be a continuous electronically controlled by a proportional solenoid 144. Upon receiving an instruction from the electronic control unit 80 of the vehicle 2, the proportional solenoid 144 will transition the third valve 142 between a first position and a second position. When the third valve 142 is in the first (non-powered) position, the third valve 142 is not providing any pressure relieving or pressure reducing function. However, when the third valve 142 is in the second (powered) position, the third valve 142 is providing an amount of pressure relieving or pressure reducing function for the one or more power supply hydraulic lines 118. The amount of fluid (not shown) relieved from the one or more power supply hydraulic lines 118, is transmitted to a tank or reservoir 146.

In fluid communication with both the line A 138 and the line B 140 of the one or more power supply hydraulic lines 118 is a fourth valve 148. The fourth valve 148 is able to connect and/or disconnect the motor or pump 136 to and/or from the one or more power supply hydraulic lines 118 of the hydraulic circuit 90 of the vehicle 2. Additionally, according to an embodiment of the disclosure and as a non-limiting example, the fourth valve 148 of the hydraulic circuit 90 may be electronically controlled by solenoid 150. Upon receiving an instruction from the electronic control unit 80 of the vehicle 2, the solenoid 150 will transition the fourth valve 148 between a first position and a second position. When the fourth valve 148 is in the first position, the one or more power supply hydraulic lines 118 are in fluid communication with the motor or pump 136 of the vehicle 2. However, when the fourth valve 148 is in the second position, the one or more power supply hydraulic lines 118 are not in fluid communication with the motor or pump 136 thereby disconnecting the motor or pump 136 from the one or more power supply hydraulic lines 118 of the hydraulic circuit 90. As a non-limiting example, the fourth valve 148 of the hydraulic circuit may be a discrete 2-position 4-way valve.

As illustrated in FIG. 3 of the disclosure and as a non-limiting example, the amount of pressure traveling to the motor or pump 136 of the hydraulic circuit 90 is controlled by the third valve 142 and the fourth valve 148. Additionally, as illustrated in FIG. 3 of the disclosure and as a non-limiting example, the hydraulic circuit 90 may further include an orifice 152 that is in fluid communication with the one or more power supply hydraulic lines 118 and the fourth valve 148. The orifice 152 generates a counter-pressure at the outlet of the motor or pump 136 in order to ensure a minimum flow through to a drain 153 of the motor or pump 136 of the hydraulic circuit 90. As a non-limiting example the drain 153 may be a part of the tank or reservoir 146 or may be separate from the tank or reservoir 146 illustrated in FIG. 3 of the disclosure.

It is within the scope of this disclosure and as a non-limiting example, the fourth valve 148 may include the use of a return spring 154. The return spring 154 of the fourth valve 148 aids in transitioning the fourth valve 148 between the first position and the second position previously described.

In order to ensure that safe operation of the vehicle 2, the amount of pressure applied to the motor or pump 136 by the adaptive park braking system, can only occur when the one or more service brake hydraulic lines 114 have an amount of pressure needed to keep the vehicle 2 from moving. This can be achieved by measuring the amount of pressure applied by the brake pedal (not shown) to the one or more brake pressure sensor hydraulic lines 129 by using the one or more brake pressure sensors 128 and by measuring the amount of pressure within the one or more service brake hydraulic lines 114 by using one or more pressure sensors (not shown). If the amount of pressure within the one or more brake pressure sensor hydraulic lines 129 and the one or more service brake hydraulic lines 114 is different, the occurrence of a brake pedal actuation can be determined and a release of the pressure from within the motor or pump 136 can be imposed.

As illustrated in FIG. 4 of the disclosure, the supply circuit 91 includes a second motor or pump 156 that is in fluid communication with the one or more parking brake hydraulic lines 110, the one or more APB supply hydraulic lines 112 and the one or more power supply hydraulic lines 118 of the hydraulic circuit 90 via a hydraulic output line 158. Fluidly connected to an end of the second motor or pump 156 of the supply circuit 91 is a return tank line 160 which in turn is in fluid connection with a tank or reservoir 162. It is within the scope of this disclosure and as a non-limiting example that the tank or reservoir 162, illustrated in FIG. 4, may be a part of the drain, tank or reservoir 146 and/or 153 illustrated in FIG. 3 of the disclosure. Additionally, it is within the scope of this disclosure and as a non-limiting example that the tank or reservoir 162, illustrated in FIG. 4 may be separate from the drain, take or reservoir 146 and/or 153 illustrated in FIG. 3 of the disclosure. As a non-limiting example, the second motor or pump 156 may be a variable displacement pump.

At least a portion of the hydraulic output line 158 of the second motor or pump 156 is in fluid communication with at least a portion of the one or more power supply hydraulic lines 118 and one or more intermediate hydraulic lines 164. As best seen in FIG. 4 of the disclosure and as a non-limiting example, the hydraulic output line 158 of the second motor or pump 156 is in direct fluid communication with the one or more power supply hydraulic lines 118 of the hydraulic circuit 90. However, as illustrated in FIG. 4 of the disclosure and as a non-limiting example, the hydraulic output line 158 of the second motor or pump 156 is indirectly in fluid communication with the one or more parking brake hydraulic lines 110, the one or more APB supply hydraulic lines 112 and one or more hydraulic pilot lines 165. As best seen in FIG. 4 and as a non-limiting example, the one or more intermediate hydraulic lines 164 and one or more hydraulic supply lines 166 fluidly connect the one or more parking brake hydraulic lines 110 and the one or more APB supply hydraulic lines 112 to the hydraulic output line 158 of the second motor or pump 156.

One or more check valves 168 are disposed along and are in fluid communication with the one or more intermediate hydraulic lines 164 of the supply circuit 91. The one or more check valves 168 of the supply circuit 91 restricts the flow of fluid (not shown) within the one or more intermediate hydraulic lines 164 to one direction. In accordance with the embodiment illustrated in FIG. 4 of the disclosure and as a non-limiting example, the one or more check valves 168 allow for the flow of fluid from the second motor or pump 156 to the one or more hydraulic supply lines 166 but prevents the flow of fluid from the supply lines 166 back to the second motor or pump 156. This prevents one or more accumulators 170 that are in fluid communication with the hydraulic supply lines 166 from transmitting an amount of fluid (not shown) through the one or more intermediate hydraulic lines 164 to the second motor or pump 156. As a non-limiting example the one or more check valves 168 may be a one-way check valve.

It is to be understood that the one or more accumulators 170 of the supply circuit 91 may be used in order to stabilize the upstream pressure level of the one or more parking brake hydraulic lines 110 and the one or more APB supply hydraulic lines 112. This aids in ensuring that the one or more parking brake hydraulic lines 110 and the one or more APB supply hydraulic lines 112 maintain a substantially constant pressure and/or flow even in the event that the second motor or pump 156 fails.

In fluid communication with the one or more hydraulic pilot lines 165 of the supply circuit 91 is a fifth valve 172. According to the embodiment of the disclosure illustrated in FIG. 4 and as a non-limiting example, the fifth valve 172 may be electronically controlled by a solenoid 174. Upon receiving a signal from the electronic control unit 80 of the vehicle 2, the solenoid 174 will transition the fifth valve 172 between a first position and a second position. When the fifth valve 172 is in the first position, the one or more hydraulic pilot lines 165 are pressurized to substantially the same pressure level as the one or more accumulators 170 of the supply circuit 91. When the fifth valve 172 is in the second position, the one or more hydraulic pilot lines 165 of the supply circuit 91 are not pressurized and are in fluid communication a tank or reservoir 176. It is within the scope of this disclosure and as a non-limiting example that the tank or reservoir 176 may be a part of the drain, tanks or reservoirs 146, 153 and/or 162 or may be a separate tank or reservoir from the drain, tanks or reservoirs 146, 153 and/or 162 illustrated in FIGS. 3 and 4 of the disclosure. As a non-limiting example, the fifth valve 172 may be a 2-position 3-way valve.

It is within the scope of this disclosure and as a non-limiting example, the fifth valve 172 may include the use of a spring 178. The spring 178 of the fifth valve 172 aids in transitioning the fifth valve 172 between the first position and the second position previously described. As a non-limiting example the spring 178 may be a variable spring.

A sixth valve 180 is in fluid communication with the one or more parking brake hydraulic lines 110 of the hydraulic circuit 90. In accordance with the embodiment of the disclosure illustrated in FIGS. 3 and 4 and as a non-limiting example, the sixth valve 180 may be interposed between the one or more hydraulic supply lines 166 of the supply circuit 91 and the first valve 122 of the hydraulic circuit 90 of the vehicle 2. It is within the scope of this disclosure and as a non-limiting example that the sixth valve 180 may be a pressure relieving or pressure reducing valve. The sixth valve 180 of the supply circuit 91 is tuned in order to ensure that the pressure within the one or more parking brake hydraulic lines 110 does not exceed a pre-determined optimal operating pressure OP1. As a result, the sixth valve 180 of the one or more parking brake hydraulic lines 110 is used to maintain the one or more parking brake hydraulic lines 110 at the pre-determined optimal operating pressure OP1. It is within the scope of this disclosure and as a non-limiting example that the pre-determined optimal operating pressure OP1 may be from approximately 25 bar to approximately 45 bar.

In accordance with an embodiment of the disclosure and as a non-limiting example, the sixth valve 180 may be electronically controlled by the electronic control unit 80 of vehicle 2. In the event that one or more pressure sensors (not shown) in communication with the one or more parking brake hydraulic lines 110 detect a pressure above the pre-determined optimal operating pressure OP1, the electronic control unit 80 will instruct the sixth valve 180 to open placing the one or more parking brake hydraulic lines 110 in fluid communication with a tank or reservoir 182. Once the pressure within the one or more parking brake hydraulic lines 110 has returned to the pre-determined operating pressure OP1, the electronic control unit 80 will instruct the sixth valve 180 to close thereby fluidly disconnecting the one or more parking brake hydraulic lines 110 from the tank or reservoir 182. It is within the scope of this disclosure and as a non-limiting example that the tank or reservoir 182 may be a part of the drain, tanks or reservoirs 146, 153, 162 and/or 176 or may be a separate tank or reservoir from the drain, tanks or reservoirs 146, 153, 162 and/or 176 illustrated in FIGS. 3 and 4 of the disclosure.

According to an alternative embodiment of the disclosure and as a non-limiting example, the sixth valve 180 may be designed to automatically open and close at a pre-determined pressure(s) in order to ensure that the one or more parking brake hydraulic lines 110 are maintained at the pre-determined optimum operating pressure OP1. This can be achieve by using a spring 184 that is part of the sixth valve 180. It is within the scope of this disclosure and as a non-limiting example that the spring 184 of the sixth valve 180 may be a variable spring. As previously discussed and as a non-limiting example, the pre-determined optimum operating pressure OP1 may be approximately 35 bar.

A seventh valve 186 is in fluid communication with the one or more APB supply hydraulic lines 112 of the hydraulic circuit 90. It is within the scope of this disclosure and as a non-limiting example that the seventh valve 186 may be a pressure relieving or pressure reducing valve. The seventh valve 186 of the supply circuit 91 is tuned in order to ensure that the pressure within the one or more APB supply hydraulic lines 112 do not exceed a pre-determined optimal operating pressure OP2. As a result, the seventh valve 186 of the one or more APB supply hydraulic lines 112 is used to maintain the one or more APB supply hydraulic lines 112 at the pre-determined optimal operating pressure OP2. It is within the scope of this disclosure and as a non-limiting example that the pre-determined optimal operating pressure OP2 may be from approximately 70 bar to approximately 90 bar.

In accordance with an embodiment of the disclosure and as a non-limiting example, the seventh valve 186 may be electronically controlled by the electronic control unit 80 of vehicle 2. In the event that one or more pressure sensors (not shown) in communication with the one or more APB supply hydraulic lines 112 detect a pressure above the pre-determined optimal operating pressure OP2, the electronic control unit 80 will instruct the seventh valve 186 to open placing the one or more APB supply hydraulic lines 112 in fluid communication with a tank or reservoir 188. Once the pressure within the one or more APB supply hydraulic lines 112 has returned to the pre-determined operating pressure OP2, the electronic control unit 80 will instruct the seventh valve 186 to close thereby fluidly disconnecting the APB supply hydraulic lines 112 from the tank or reservoir 188. It is within the scope of this disclosure and as a non-limiting example that the tank or reservoir 188 may be a part of the drain, tanks or reservoirs 146, 153, 162, 176 and/or 182 or may be a separate tank or reservoir from the drain, tanks or reservoirs 146, 153, 162, 176 and/or 182 illustrated in FIGS. 3 and 4 of the disclosure.

According to an alternative embodiment of the disclosure and as a non-limiting example, the seventh valve 186 may be designed to automatically open and close at a pre-determined pressure(s) in order to ensure that the one or more APB supply hydraulic lines 112 are maintained at the pre-determined optimum operating pressure OP2. This may be achieved by using a spring 190 that is part of the seventh valve 186. It is within the scope of this disclosure and as a non-limiting example that the spring 190 of the seventh valve 186 may be a variable spring. As previously discussed and as a non-limiting example, the pre-determined optimum operating pressure OP2 may be approximately 80 bar.

The first step in the adaptive park braking method includes generating an amount of pressure within the one or more parking brake hydraulic lines 110 and/or the one or more service brake hydraulic lines 114 of the hydraulic circuit 90 of the vehicle 2. After an amount of pressure has been applied to the one or more parking brake hydraulic lines 110 and/or the one or more service brake hydraulic lines 114, the one or more parking brake assemblies 120 are released. Finally, after the one or more parking brake assemblies 120 have been released, an amount of pressure is generated within the motor.

Figure 5:
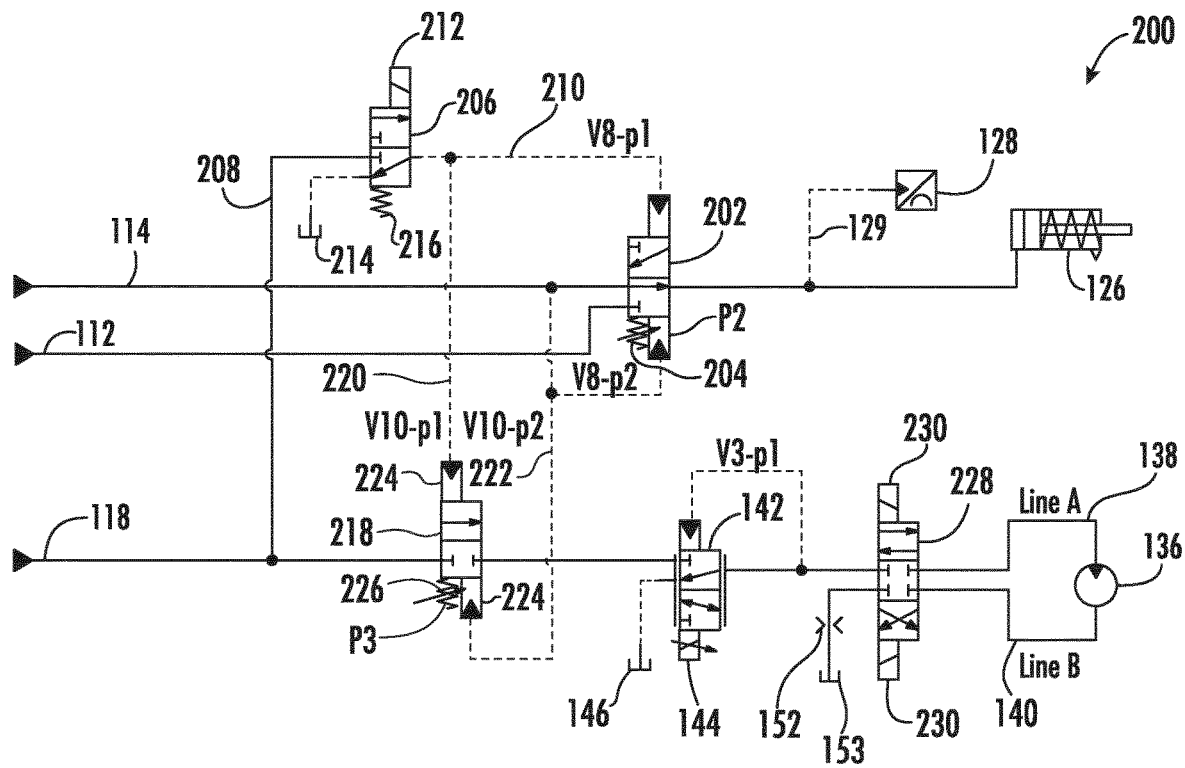
FIG. 5 is a schematic illustration of the adaptive park braking system hydraulic circuit illustrated in FIGS. 1 and 3 according to an alternative embodiment of the disclosure.

FIG. 5 is a schematic illustration of an adaptive park braking system hydraulic circuit (hereinafter the "hydraulic circuit") 200 according to an alternative embodiment of the disclosure. The hydraulic circuit 200 illustrated in FIG. 5 is the same as the hydraulic circuit 90 illustrated in FIGS. 1 and 3, except where specifically noted below. As illustrated in FIG. 5 of the disclosure, the hydraulic circuit 200 does not include the one or more parking brake hydraulic lines 110, the one or more parking brake assemblies 120, the first valve 122 or second valve 130 illustrated in FIGS. 3 and 4 of the disclosure.

In accordance with the embodiment of the disclosure illustrated in FIG. 5 and as a non-limiting example, the hydraulic circuit 200 includes an eighth valve 202 that is in fluid communication with the one or more service brake hydraulic lines 114 and the one or more APB supply hydraulic lines 112 of the hydraulic circuit 200. As a result, the eight valve 202 of the hydraulic circuit 200 is able to selectively put the one or more APB supply hydraulic lines 112 in fluid communication with the one or more service brake hydraulic lines 114 of the hydraulic circuit 200. It is within the scope of this disclosure and as a non-limiting example eighth valve 202 may be electronically controlled by using one or more solenoids and/or hydraulically controlled by using one or more hydraulic pilots. Upon receiving a signal from the electronic control unit 80 of the vehicle 2, the eighth valve 202 will be transitioned between a first position and a second position. When the eighth valve 202 is in the first (non-powered) position, the one or more APB supply hydraulic lines 112 are not in fluid communication with the one or more service brake assemblies 126 of the vehicle 2. In this position the vehicle 2 preserves all of the functionality and safety features that are available in a standard vehicle 2. However, when the eighth valve 202 is in the second (powered) position, the one or more of the one or more APB supply hydraulic lines 112 are in fluid communication with the one or more service brake assemblies 126 of the vehicle 2. As a result, when the eighth valve 202 is in the second position, the one or more service brake assemblies 126 receive an amount of pressure from the one or more APB supply hydraulic lines 112 needed to hold the vehicle 2 against a pre-load generated by the motor 4. As a non-limiting example, the eighth valve 202 of the hydraulic circuit 200 may be a 2-position 3-way valve.

It is within the scope of this disclosure and as a non-limiting example, the eighth valve 202 may include the use of a spring 204. The spring 204 of the eighth valve 202 aids in transitioning the eighth valve 202 between the first position and the second position previously described. As a non-limiting example the spring 204 may be a variable spring.

In the event that the brake pedal (not shown) is actuated by the operator 94 of the vehicle 2 during operation of the adaptive park braking system, and the pressure P2 within the one or more service brake hydraulic lines 114 exceeds a pre-determined amount, the eighth valve 202 returns to its first (non-powered) position. As a non-limiting example, the pre-determined pressure P2 may be from approximately 10 bar to approximately 30 bar.

As illustrated in FIG. 5 of the disclosure and as a non-limiting example, the hydraulic circuit 200 may further include a ninth valve 206 that is in fluid communication with the one or more power supply hydraulic lines 118 by using a first ninth valve hydraulic line 208. Additionally, as illustrated in FIG. 5 of the disclosure and as a non-limiting example the ninth valve 206 may also be in fluid communication with the eighth valve 202 of the hydraulic circuit 200 by using a second ninth valve hydraulic line 210. In accordance with an embodiment of the disclosure and as a non-limiting example, the ninth valve 206 of the hydraulic circuit 200 may be a 2-position 3-way valve.

It is within the scope of this disclosure and as a non-limiting example, that the ninth valve 206 of the hydraulic circuit 200 may be electronically controlled by a solenoid 212. Upon receiving a signal from the electronic control unit 80 and/or the operator 94 of the vehicle 2, the ninth valve 206 will transition between a first position and a second position. When the ninth valve 206 is in the first position, flow from the one or more power supply hydraulic lines 118 is prevented, and the second ninth valve hydraulic line 210 is in fluid communication with a tank or reservoir 214. It is within the scope of this disclosure and as a non-limiting example that the tank or reservoir 214 may be part of the drain, tanks or reservoirs 146, 153, 162, 182 and/or 188 or may be separate from the drain, tanks or reservoirs 146, 153, 162, 182 and/or 188. When the ninth valve 206 is in the second position, the one or more power supply hydraulic lines 118 are in fluid communication with the eighth valve 202 of the hydraulic circuit 200 illustrated in FIG. 5. As a result, the ninth valve 206 of the hydraulic circuit 200 allows the adaptive park braking system of the vehicle 2 to be enabled (engaged) or disabled (disengaged) by receiving a signal from the electronic control unit 80 and/or by receiving a signal from the operator 94 of the vehicle 2 by way of a switch in the cab of the vehicle 2.

According to an embodiment of the disclosure and as a non-limiting example, the ninth valve 206 may include the use of a spring 216. The spring 216 of the ninth valve 206 aids in transitioning the ninth valve 206 between the first position and the second position previously described. As a non-limiting example the spring 216 may be a variable spring.

In fluid communication with the one or more power supply hydraulic lines 118, the second ninth valve hydraulic line 210 and the one or more service brake hydraulic lines 114 of the hydraulic circuit 200 is a tenth valve 218. As illustrated in FIG. 5 of the disclosure and as a non-limiting example, the tenth valve 218 is in fluid communication with the second ninth vale hydraulic line 210 by using a first tenth valve hydraulic line 220. Additionally, as illustrated in FIG. 5 of the disclosure and as a non-limiting example, the tenth valve 218 is in fluid communication with the one or more service brake hydraulic lines 114 by using a second tenth valve hydraulic line 222. As a non-limiting example, the tenth valve 218 may be a 2-position 2-way valve.

It is within the scope of this disclosure and as a non-limiting example tenth valve 218 may be electronically controlled by using one or more solenoids and/or hydraulically controlled by using one or more hydraulic pilots 224. According to the embodiment of the disclosure illustrated in FIG. 5 and as a non-limiting example, the tenth valve 218 is hydraulically controlled by using the one or more hydraulic pilots 224. By making the tenth valve 218 of the hydraulic circuit 200 hydraulically controlled by the one or more hydraulic pilots 224, it ensures that the supply of fluid (not shown) to the motor or pump 136 may only occur when the adaptive park brake system is activated. As a result, when the tenth valve 218 is in a first (non-powered) position, the adaptive park braking system is not activated and the flow of fluid (not shown) to the motor or pump 136 is prevented. However, when the tenth valve 218 is in a second (powered) position, the adaptive park braking system has been activated and an amount of fluid (not shown) is permitted to the motor or pump 136 of the hydraulic circuit 200.

According to ab embodiment of the disclosure and as a non-limiting example, the tenth valve 218 may include the use of a spring 226. The spring 226 of the tenth valve 218 aids in transitioning the tenth valve 218 between the first position and the second position previously described. As a non-limiting example the spring 226 may be a variable spring.

In the event that the pressure P3 within the one or more power supply hydraulic lines 118 exceeds a pre-determined amount, the tenth valve 218 returns to its first (non-powered) position. As a non-limiting example, the pre-determined pressure P3 may be from approximately 110 bar to approximately 130 bar.

An eleventh valve 228 is in fluid communication with at least a portion of the one or more power supply hydraulic line 118 of the hydraulic circuit 200. As illustrated in FIG. 5 of the disclosure and as a non-limiting example, the eleventh valve 228 is interposed between the third valve 142 and the motor or pump 136 of the hydraulic circuit 200. Additionally, as illustrated in FIG. 5 of the disclosure, the eleventh valve 228 of the hydraulic circuit 200 is in fluid communication with the line A 138 and the line B 140 of the one or more power supply hydraulic lines 118. As a result, the eleventh valve 228 is able to selectively connect and/or disconnect the motor or pump 136 to and/or from the one or more power supply hydraulic lines 118 of the hydraulic circuit 200. It is within the scope of this disclosure and as a non-limiting example that the eleventh valve 228 of the hydraulic circuit 200 may be a 3-position 4-way valve.

In accordance with an embodiment of the disclosure illustrated in FIG. 5 and as a non-limiting example, the eleventh valve 228 of the hydraulic circuit 200 may be electronically controlled by using one or more solenoids 230. Upon receiving an instruction from the electronic control unit 80 of the vehicle 2, the one or more solenoids 230 will transition the eleventh valve 228 between a first position and a second position. When the eleventh valve 228 is in the first position, the one or more power supply hydraulic lines 118 are in fluid communication with the motor or pump 136 of the vehicle 2. However, when the eleventh valve 228 is in the second position, the one or more power supply hydraulic lines 118 are not in fluid communication with the motor or pump 136 thereby disconnecting the motor or pump 136 from the one or more power supply hydraulic lines 118 of the hydraulic circuit 200.

As illustrated in FIG. 5 of the disclosure and as a non-limiting example, the amount of pressure traveling to the motor or pump 136 of the hydraulic circuit 200 is controlled by the third valve 142 and the eleventh valve 228. In accordance with the embodiment of the disclosure illustrated in FIG. 5 and as a non-limiting example, the eleventh valve 228 sets the direction of the motor or pump 136 of the hydraulic circuit 200 of the vehicle 2.

Additionally, as illustrated in FIG. 5 of the disclosure and as a non-limiting example, the hydraulic circuit 200 may further include the orifice 152 that is in fluid communication with the one or more power supply hydraulic lines 118 and the eleventh valve 228. The orifice 152 generates a counter-pressure at the outlet of the motor or pump 136 in order to ensure a minimum flow through to the drain 153 of the motor or pump 136 of the hydraulic circuit 200. Additionally, the orifice 152 creates a back-pressure that aids in providing a motor cooling function via a flushing valve.

It is to be understood that the hydraulic circuit 200 illustrated in FIG. 5 may be in fluid communication with and operably configured to operate in communication with the supply circuit 91 illustrated in FIG. 4 and described previously in the document.

Figure 6:
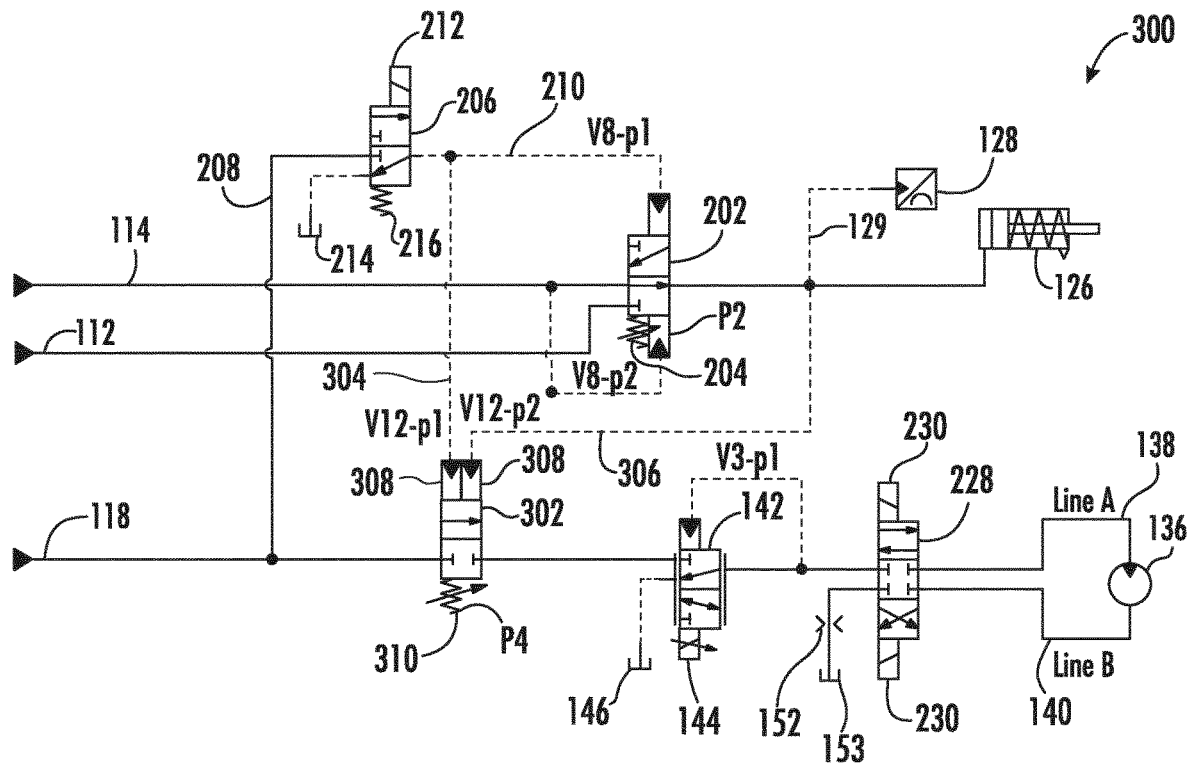
FIG. 6 is a schematic illustration of the adaptive park braking system hydraulic circuit illustrated in FIGS. 1, 3 and 5 according to another embodiment of the disclosure.

FIG. 6 is a schematic illustration of an adaptive park braking system hydraulic circuit (hereinafter the "hydraulic circuit") 300 according to another embodiment of the disclosure. The hydraulic circuit 300 illustrated in FIG. 6 is the same as the hydraulic circuits 90 and 200 illustrated in FIGS. 1, 3 and 5, except where specifically noted below. As illustrated in FIG. 6 of the disclosure, the hydraulic circuit 300 does not include the use of the tenth valve 218 illustrated in FIG. 5.

As illustrated in FIG. 6 of the disclosure and as a non-limiting example, the hydraulic circuit 300 includes a twelfth valve 302 that is in fluid communication with a first twelfth valve hydraulic line 304 and a second twelfth valve hydraulic line 306. An end of the first twelfth valve hydraulic line 304, opposite the twelfth valve 302, is in fluid communication with the second ninth valve hydraulic line 210. An end of the second twelfth valve hydraulic line 306, opposite the twelfth valve 302, is in fluid connection with the one or more brake pressure sensor hydraulic lines 129 and/or the one or more service brake lines 114 of the hydraulic circuit 300. As a non-limiting example, the twelfth valve 302 may be a 2-position 2-way valve.

It is within the scope of this disclosure and as a non-limiting example twelfth valve 302 may be electronically controlled by using one or more solenoids and/or hydraulically controlled by using one or more hydraulic pilots 308. According to the embodiment of the disclosure illustrated in FIG. 6 and as a non-limiting example, the twelfth valve 302 is hydraulically controlled by using the one or more hydraulic pilots 308. By making the twelfth valve 302 of the hydraulic circuit 300 hydraulically controlled by the one or more hydraulic pilots 308, it ensures that the supply of fluid (not shown) to the motor or pump 136 may only occur when the adaptive park brake system is activated. For example, the twelfth valve 302 will only allow an amount of fluid (not shown) to be applied to the motor or pump 136 if there is pressure within the one or more power supply hydraulic lines 118 and there is pressure within the one or more brake pressure sensor hydraulic lines 129 and/or the one or more service brake hydraulic lines 114. As a result, when the twelfth valve 302 is in a first (non-powered) position, the adaptive park braking system is not activated and the flow of fluid (not shown) to the motor or pump 136 is prevented. However, when the twelfth valve 302 is in a second (powered) position, the adaptive park braking system has been activated and an amount of fluid (not shown) is permitted to the motor or pump 136 of the hydraulic circuit 300.

According to an embodiment of the disclosure and as a non-limiting example, the twelfth valve 302 may include the use of a spring 310. The spring 310 of the twelfth valve 302 aids in transitioning the twelfth valve 302 between the first position and the second position previously described. As a non-limiting example the spring 312 may be a variable spring.

In the event that the pressure P4 within the one or more power supply hydraulic lines 118 exceeds a pre-determined amount, the twelfth valve 302 returns to its first (non-powered) position. As a non-limiting example, the pre-determined pressure P4 may be from approximately 110 bar to approximately 130 bar.

It is to be understood that the hydraulic circuit 300 illustrated in FIG. 6 may be in fluid communication with and operably configured to operate in communication with the supply circuit 91 illustrated in FIG. 4 and described previously in the document.

Figure 7:
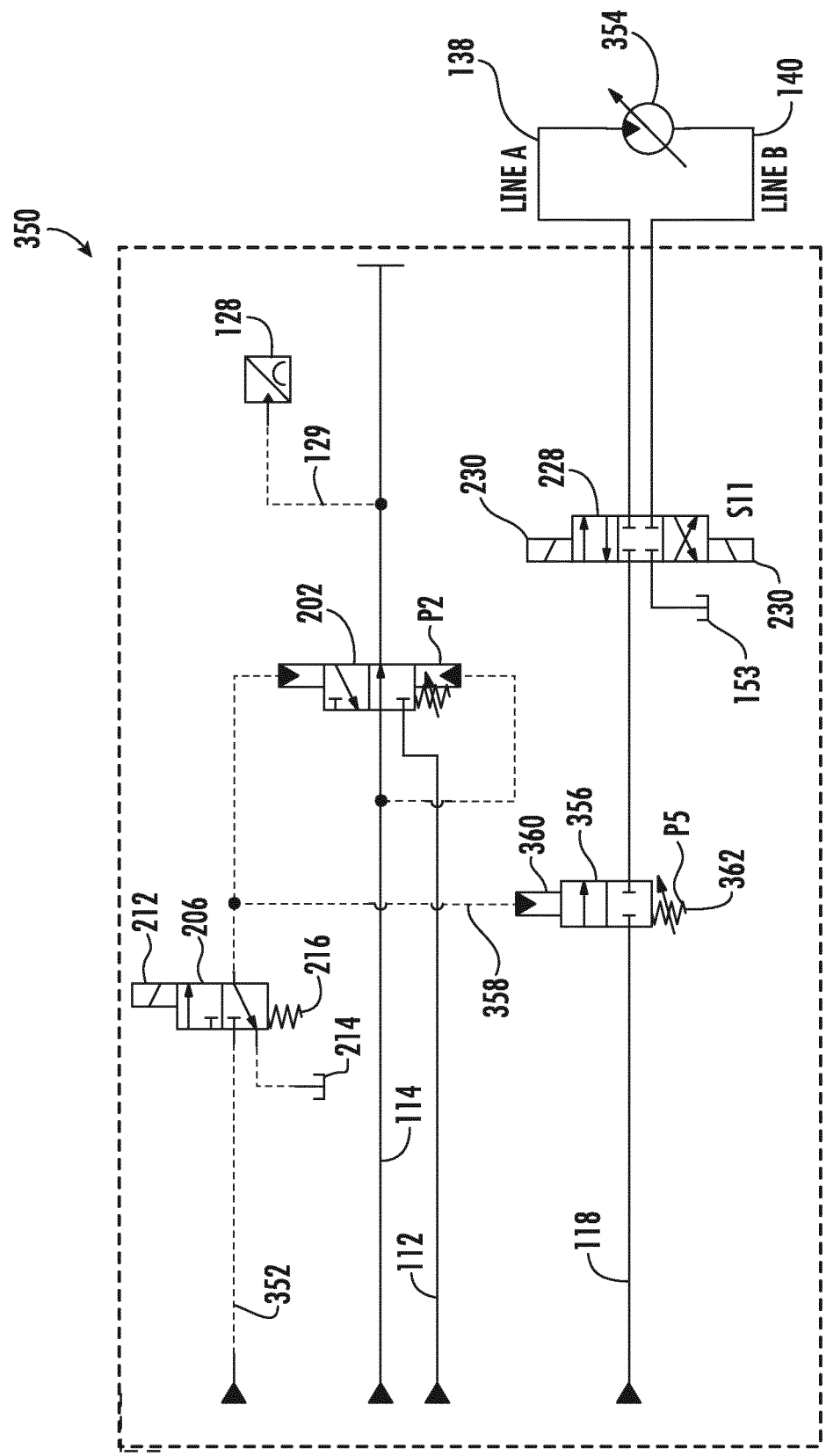
FIG. 7 is a schematic illustration of the adaptive park braking system hydraulic circuit illustrated in FIGS. 1, 3, 5 and 6 according to yet another embodiment of the disclosure.

FIG. 7 is a schematic illustration of an adaptive park braking system hydraulic circuit (hereinafter the "hydraulic circuit") 350 according to yet another embodiment of the disclosure. The hydraulic circuit 350 illustrated in FIG. 7 is the same as the hydraulic circuits 90, 200 and 300 illustrated in FIGS. 1, 3, 5 and 6, except where specifically noted below. As illustrated in FIG. 7 of the disclosure, the hydraulic circuit 350 does not include the use of the motor or pump 136, the third valve 142 or the twelfth valve 302 illustrated in FIGS. 3, 5 and 6 of the disclosure.

As illustrated in FIG. 7 of the disclosure, the hydraulic circuit 350 further includes the use of one or more pilot hydraulic lines 352 that are in fluid communication with the ninth valve 206 of the hydraulic circuit 350. In accordance with the embodiment of the disclosure illustrated in FIG. 7 and as a non-limiting example, when the ninth valve 206 is in the first position, flow from the one or more pilot hydraulic lines 352 is prevented. Additionally, in accordance with the embodiment of the disclosure illustrated in FIG. 7 and as a non-limiting example, when the ninth valve 206 is in the second position the one or more pilot hydraulic lines 352 are in fluid communication with the eighth valve 202 of the hydraulic circuit 350 illustrated in FIG. 7. As a result, the ninth valve 206 of the hydraulic circuit 350 allows the adaptive park braking system of the vehicle 2 to be enabled (engaged) or disabled (disengaged) by receiving a signal from the electronic control unit 80 and/or by receiving a signal from the operator 94 of the vehicle 2 by way of a switch in the cab of the vehicle 2.

A motor or pump 354 is in fluid communication with at least a portion of the one or more power supply hydraulic lines 118 of the hydraulic circuit 350. As best seen in FIG. 7 of the disclosure, the line A 138 of the one or more power supply hydraulic lines 118 is in fluid communication with an end of the motor or pump 354. The line B 140 of the one or more power supply hydraulic lines 118 is fluidly connected to an end of the motor or pump 354 opposite the line A 138 of the one or more powers supply hydraulic lines 118 of the hydraulic circuit 350. It is within the scope of this disclosure and as a non-limiting example that the motor or pump 354 of the hydraulic circuit 350 may be a variable displacement motor.

In fluid communication with the one or more pilot hydraulic lines 352 and the one or more power supply hydraulic lines 118 of the hydraulic circuit 350 is a thirteenth valve 356. As illustrated in FIG. 7 of the disclosure and as a non-limiting example, the thirteenth valve 356 of the hydraulic circuit 350 is in fluid communication with the one or more pilot hydraulic lines 352 by using a first thirteenth valve hydraulic line 358. As a non-limiting example, the twelfth valve 302 may be a 2-position 2-way valve.

It is within the scope of this disclosure and as a non-limiting example that the thirteenth valve 356 may be electronically controlled by using one or more solenoids and/or hydraulically controlled by using one or more hydraulic pilots 360. According to the embodiment of the disclosure illustrated in FIG. 7 and as a non-limiting example, the thirteenth valve 356 is hydraulically controlled by using the one or more hydraulic pilots 360. By making the thirteenth valve 356 of the hydraulic circuit 350 hydraulically controlled by the one or more hydraulic pilots 360, it ensures that the supply of fluid (not shown) to the motor or pump 354 may only occur when the adaptive park brake system is activated. For example, the thirteenth valve 356 will only allow an amount of fluid (not shown) to be applied to the motor or pump 354 if there is pressure within the one or more pilot hydraulic lines 352. As a result, when the thirteenth valve 356 is in a first (non-powered) position, the adaptive park braking system is not activated and the flow of fluid (not shown) to the motor or pump 354 is prevented. However, when the thirteenth valve 356 is in a second (powered) position, the adaptive park braking system has been activated and an amount of fluid (not shown) is permitted to the motor or pump 354 of the hydraulic circuit 350.

According to an embodiment of the disclosure and as a non-limiting example, the thirteenth valve 356 may include the use of a spring 362. The spring 362 of the thirteenth valve 356 aids in transitioning the thirteenth valve 356 between the first position and the second position previously described. As a non-limiting example the spring 362 may be a variable spring.

In the event that the pressure P5 within the one or more power supply hydraulic lines 118 exceeds a pre-determined amount, the thirteenth valve 356 returns to its first (non-powered) position. As a non-limiting example, the pre-determined pressure P5 may be from approximately 110 bar to approximately 130 bar.

According to the embodiment of the disclosure illustrated in FIG. 7 and as a non-limiting example, the amount of torque generated by the motor or pump 354 is not regulated by setting the pressure level within the one or more power supply hydraulic lines 118 because the third valve 146 has been removed from the hydraulic circuit 350. In accordance with the embodiment of the disclosure illustrated in FIG. 7, in order for the motor or pump 354 to generate the correct amount of torque, the adaptive park braking system measures the amount of pressure in line A 138 and Line B 140 of the one or more power supply lines 118. Based on the amount of pressure within line A 138 and line B 140 of the one or more power supply lines 118, the displacement of the motor or pump 354 is set accordingly.

It is to be understood that the hydraulic circuit 350 illustrated in FIG. 7 may be in fluid communication with and operably configured to operate in communication with the supply circuit 91 illustrated in FIG. 4 and described previously in the document. Based on the foregoing, it is therefore to be understood that the hydraulic circuit 350 illustrated in FIG. 7 provides the hydraulic circuit 350 of the adaptive park braking system with a level of hydraulic safety and displacement control.

Figure 8:
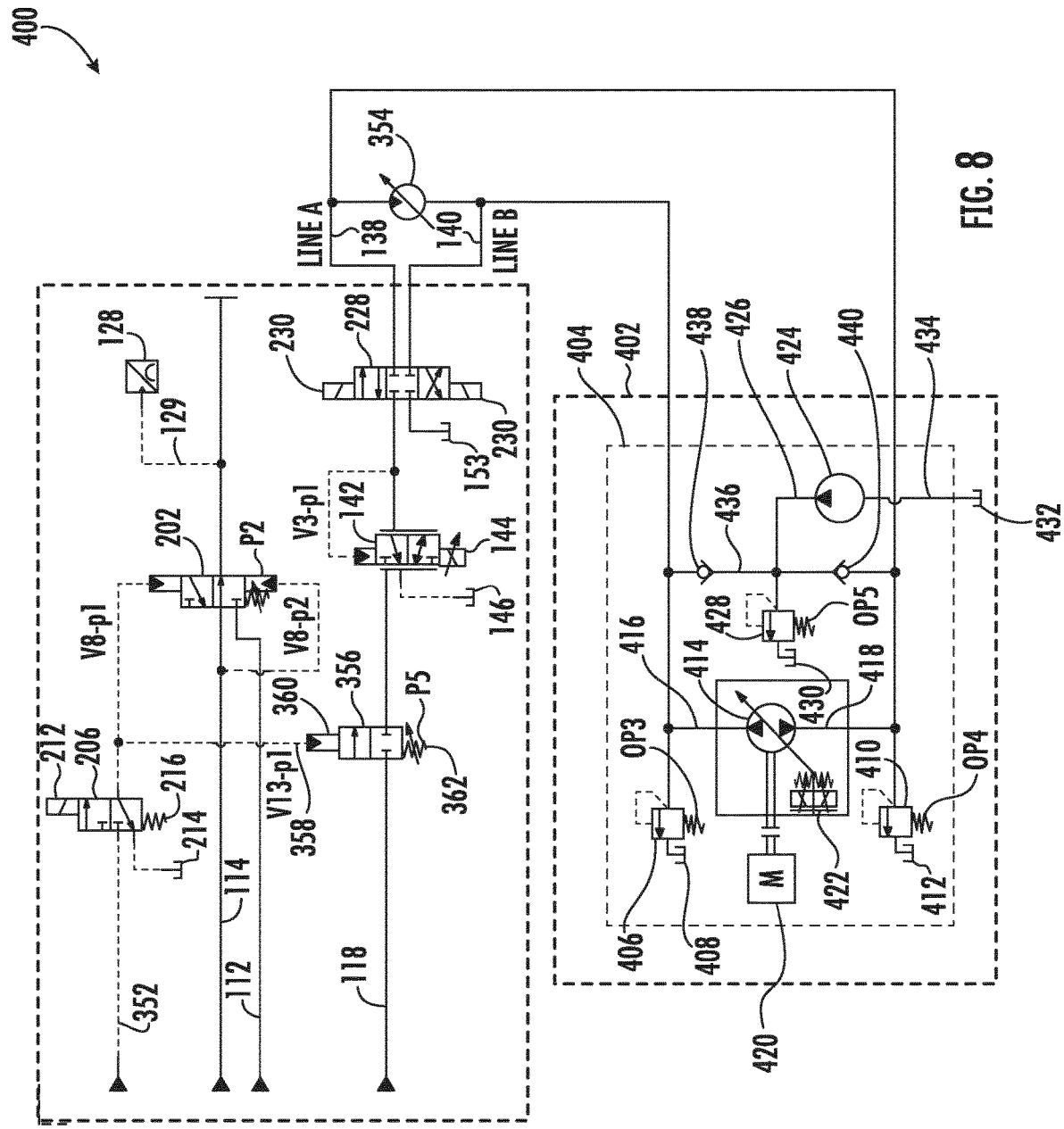
FIG. 8 is a schematic illustration of the adaptive park braking system hydraulic circuit illustrated in FIGS. 1, 3 and 5-7 according to still yet another embodiment of the disclosure.

FIG. 8 is a schematic illustration of an adaptive park braking system hydraulic circuit (hereinafter the "hydraulic circuit") 400 according to still yet another embodiment of the disclosure. The hydraulic circuit 400 illustrated in FIG. 8 is the same as the hydraulic circuits 90, 200, 300 and 350 illustrated in FIGS. 1, 3 and 5-7, except where specifically noted below. As illustrated in FIG. 8 of the disclosure, the hydraulic circuit 400 includes a closed hydraulic transmission 402 having a transmission 404 according to an embodiment of the disclosure.

The hydraulic circuit 400 illustrated in FIG. 8 of the disclosure includes the third valve 142 in fluid communication with the one or more power supply hydraulic lines 118 of the hydraulic circuit 400. In accordance with the embodiment of the disclosure illustrated in FIG. 8 and as a non-limiting example, the third valve 142 is interposed between the thirteenth valve 356 and the eleventh valve 228 of the one or more power supply hydraulic lines 118 of the hydraulic circuit 400. As previously discussed, the third valve 142 provides a pressure reducing or pressure relieving function for the one or more power supply hydraulic lines 118 of the hydraulic circuit 400. As a result, the third valve 142 is able to control the amount of torque that is generated by the motor or pump 354 of the hydraulic circuit 400 by controlling the amount of fluid pressure is transmitted through the one or more power supply hydraulic lines 118 to the motor or pump 354.

In fluid communication with an end of line B 140 of the one or more power supply hydraulic lines 118 of the hydraulic circuit 400, opposite the motor or pump 354, within the transmission pump 404 is a fourteenth valve 406. It is within the scope of this disclosure and as a non-limiting example that the fourteenth valve 406 may be a pressure relieving or pressure reducing valve. The fourteenth valve 406 of the transmission pump 404 of the hydraulic circuit 400 is tuned in order to ensure that the pressure within line B 140 of the one or more power supply hydraulic lines 118 does not exceed a pre-determined optimal operating pressure OP3. As a result, the fourteenth valve 406 of line B 140 of the one or more power supply hydraulic lines 118 is used to maintain line B 140 of the hydraulic circuit 400 at the pre-determined optimal operating pressure OP3. It is within the scope of this disclosure and as a non-limiting example that the pre-determined optimal operating pressure OP3 may be approximately 440 bar to approximately 460 bar.

According to the embodiment of the disclosure illustrated in FIG. 8 and as a non-limiting example, the fourteenth valve 406 may be electronically controlled by the electronic control unit 80 of vehicle 2. In the event that one or more pressure sensors (not shown) in communication with line B 140 detect a pressure above the pre-determined optimal operating pressure OP3, the electronic control unit 80 will instruct the fourteenth valve 406 to open placing line B 140 in fluid communication with a tank or reservoir 408. Once the pressure within line B 140 of the one or more power supply hydraulic lines 118 has returned to the pre-determined operating pressure OP3, the electronic control unit 80 will instruct the fourteenth valve 406 to close thereby fluidly disconnecting line B 140 from the tank or reservoir 408. It is within the scope of this disclosure and as a non-limiting example that the tank or reservoir 408 may be a part of the drain, tanks or reservoirs 146, 153, 162, 176, 182, 188 and/or 214 or may be a separate tank or reservoir from the drain, tanks or reservoirs 146, 153, 162, 176, 182, 188 and/or 214 illustrated in FIGS. 3-7 of the disclosure.

A fifteenth valve 410 of the transmission pump 404 is in fluid communication with an end of the line A 138 of the one or more power transmission hydraulic lines 118, opposite the motor or pump 354 of the hydraulic circuit 400. It is within the scope of this disclosure and as a non-limiting example that the fifteenth valve 410 may be a pressure relieving or pressure reducing valve. The fifteenth valve 410 of the transmission pump 404 of the hydraulic circuit 400 is tuned in order to ensure that the pressure within line A 138 of the one or more power supply hydraulic lines 118 does not exceed a pre-determined optimal operating pressure OP4. As a result, the fifteenth valve 410 of line A 138 of the one or more power supply hydraulic lines 118 is used to maintain line A 138 of the hydraulic circuit 400 at the pre-determined optimal operating pressure OP4. It is within the scope of this disclosure and as a non-limiting example that the pre-determined optimal operating pressure OP4 may be approximately 440 bar to approximately 460 bar.

In accordance with the embodiment of the disclosure illustrated in FIG. 8 and as a non-limiting example, the fifteenth valve 410 may be electronically controlled by the electronic control unit 80 of vehicle 2. In the event that one or more pressure sensors (not shown) in communication with line A 138 detect a pressure above the pre-determined optimal operating pressure OP4, the electronic control unit 80 will instruct the fifteenth valve 410 to open placing line A 138 in fluid communication with a tank or reservoir 412. Once the pressure within line A 138 of the one or more power supply hydraulic lines 118 has returned to the pre-determined operating pressure OP4, the electronic control unit 80 will instruct the fifteenth valve 410 to close thereby fluidly disconnecting line A 138 from the tank or reservoir 412. It is within the scope of this disclosure and as a non-limiting example that the tank or reservoir 412 may be a part of the drain, tanks or reservoirs 146, 153, 162, 176, 182, 188, 214 and/or 408 or may be a separate tank or reservoir from the drain, tanks or reservoirs 146, 153, 162, 176, 182, 188, 214 and/or 408 illustrated in FIGS. 3-8 of the disclosure.

In fluid communication with line A 138 and line B 140 of the one or more power supply hydraulic lines 118 of the hydraulic circuit 400 at a point upstream from the fourteenth and fifteenth valves 406 and 410 is a third motor or pump 414 of the transmission pump 404. As illustrated in FIG. 8 of the disclosure and as a non-limiting example, the third motor or pump 414 is in fluid communication with line B 140 of the one or more power supply hydraulic lines 118 by using a first line 416. Additionally, as illustrated in FIG. 8 of the disclosure and as a non-limiting example, the third motor or pump 414 is in fluid communication with line A 138 of the one or more power supply hydraulic lines 118 a second line 418. It is within the scope of this disclosure and as a non-limiting example that the third motor or pump 414 of the hydraulic circuit 400 may be a bi-directional variable displacement hydraulic pump.

A motor 420 may be in communication with at least a portion of the third motor or pump 414 of the transmission pump 404 of the hydraulic circuit 400. In accordance with the embodiment of the disclosure illustrated in FIG. 8 and as a non-limiting example, the third motor or pump 414 may further include the use of one or more solenoids 422. It is within the scope of this disclosure that the one or more solenoids 422 may control the amount the third motor or pump 414 is displaced. As a non-limiting example, the one or more solenoids 422 may be one or more proportional solenoids. Additionally, as a non-limiting example, the motor 420 may be an electric motor, a hydraulic motor, an internal combustion engine, an external combustion engine and/or a heat engine.

Interposed between the third motor or pump 414 and the motor or pump 354 of the hydraulic circuit 400 is a fourth motor or pump 424. It is within the scope of this disclosure and as a non-limiting example that the fourth motor or pump 424 may be a unidirectional fixed displacement hydraulic pump. Additionally, it is within the scope of this disclosure and as a non-limiting example that the fourth motor or pump 424 may be used as a boosting motor or pump for the hydraulic circuit 400.

According to the embodiment of the disclosure illustrated in FIG. 8 and as a non-limiting example, an end of the fourth motor or pump 424 is in fluid communication with a first line 426 having a sixteenth valve 428. It is within the scope of this disclosure and as a non-limiting example that the sixteenth valve 428 may be a pressure relieving or pressure reducing valve. The sixteenth valve 428 of the transmission pump 404 of the hydraulic circuit 400 is tuned in order to ensure that the pressure within first line 426 of the fourth motor or pump 424 does not exceed a pre-determined optimal operating pressure OP5. As a result, the sixteenth valve 428 is used to maintain first line 424 of the fourth motor or pump 424 at the pre-determined optimal operating pressure OP5. It is within the scope of this disclosure and as a non-limiting example that the pre-determined optimal operating pressure OP5 may be approximately 15 bar to approximately 35 bar.

In accordance with the embodiment of the disclosure illustrated in FIG. 8 and as a non-limiting example, the sixteenth valve 428 may be electronically controlled by the electronic control unit 80 of vehicle 2. In the event that one or more pressure sensors (not shown) in communication with first line 426 of the fourth motor or pump 424 detect a pressure above the pre-determined optimal operating pressure OP5, the electronic control unit 80 will instruct the sixteenth valve 428 to open placing first line 426 in fluid communication with a tank or reservoir 430. Once the first line 426 of the fourth motor or pump 424 has returned to the pre-determined operating pressure OP5, the electronic control unit 80 will instruct the sixteenth valve 428 to close thereby fluidly disconnecting the first line 426 from the tank or reservoir 430. It is within the scope of this disclosure and as a non-limiting example that the tank or reservoir 430 may be a part of the drain, tanks or reservoirs 146, 153, 162, 176, 182, 188, 214, 408 and/or 412 or may be a separate tank or reservoir from the drain, tanks or reservoirs 146, 153, 162, 176, 182, 188, 214, 408 and/or 412 illustrated in FIGS. 3-8 of the disclosure.

An end of the fourth motor or pump 424, opposite the first line 426, is a tank or reservoir 432. The tank or reservoir 432 of the transmission pump 404 of the hydraulic circuit 400 is in fluid communication with the tank or reservoir 432 by using a second line 434 of the fourth motor or pump 424. It is within the scope of this disclosure and as a non-limiting example that the tank or reservoir 432 may be a part of the drain, tanks or reservoirs 146, 153, 162, 176, 182, 188, 214, 408, 412 and/or 430 or may be a separate tank or reservoir from the drain, tanks or reservoirs 146, 153, 162, 176, 182, 188, 214, 408, 412 and/or 430 illustrated in FIGS. 3-8 of the disclosure.

Interposed between the sixteenth valve 428 and the fourth motor or pump 424 and in fluid communication with at least a portion of the first line 426 of the fourth motor or pump 424 is an intermediate line 436. As illustrated in FIG. 8 of the disclosure and as a non-limiting example, one end of the intermediate line 436 is in fluid communication with Line A 138 and the opposite end of the first line 426 is in fluid communication with line B 140 of the one or more power supply hydraulic lines 118 of the hydraulic circuit 400. As a result, the first line 426 and the intermediate line 436 fluidly connects the fourth motor or pump 424 to line A 138 and line B 140 of the one or more power supply hydraulic lines 118 of the hydraulic circuit 400.

The intermediate line 436 includes a first intermediate line check valve 438 and a second intermediate line check valve 440. The first intermediate line check valve 438 prevents the flow of fluid (not shown) from line B 140 of the one or more power supply hydraulic lines 118 to the fourth motor or pump 424. Additionally, the second intermediate line check valve 440 prevents the flow of fluid (not shown) from line A 138 of the one or more power supply hydraulic lines 118 to the fourth motor or pump 424. As illustrated in FIG. 8 of the disclosure and as a non-limiting example, the first and second intermediate line check valves 438 and 440 may be a one-way check valve.

It is to be understood that the embodiment of the disclosure illustrated in FIG. 8 allows for the adaptive park brake system of the vehicle 2 and the hydrostatic transmission circuit 402 to co-exist within the vehicle 2. This is achieved by incorporating the eleventh valve 228 within the hydraulic circuit 400 in combination with the motor or pump 354 and the third and thirteenth valves 142 and 362 on the one or more power supply hydraulic lines 118. It is within the scope of this disclosure that the eleventh valve 228 may create an override of the main hydraulic circuit to impose the adaptive park brake pressure set-point.

Additionally, it is to be understood that the hydraulic circuit 400 illustrated in FIG. 8 may be in fluid communication with and operably configured to operate in communication with the supply circuit 91 illustrated in FIG. 4 and described previously in the document.

Figure 9:
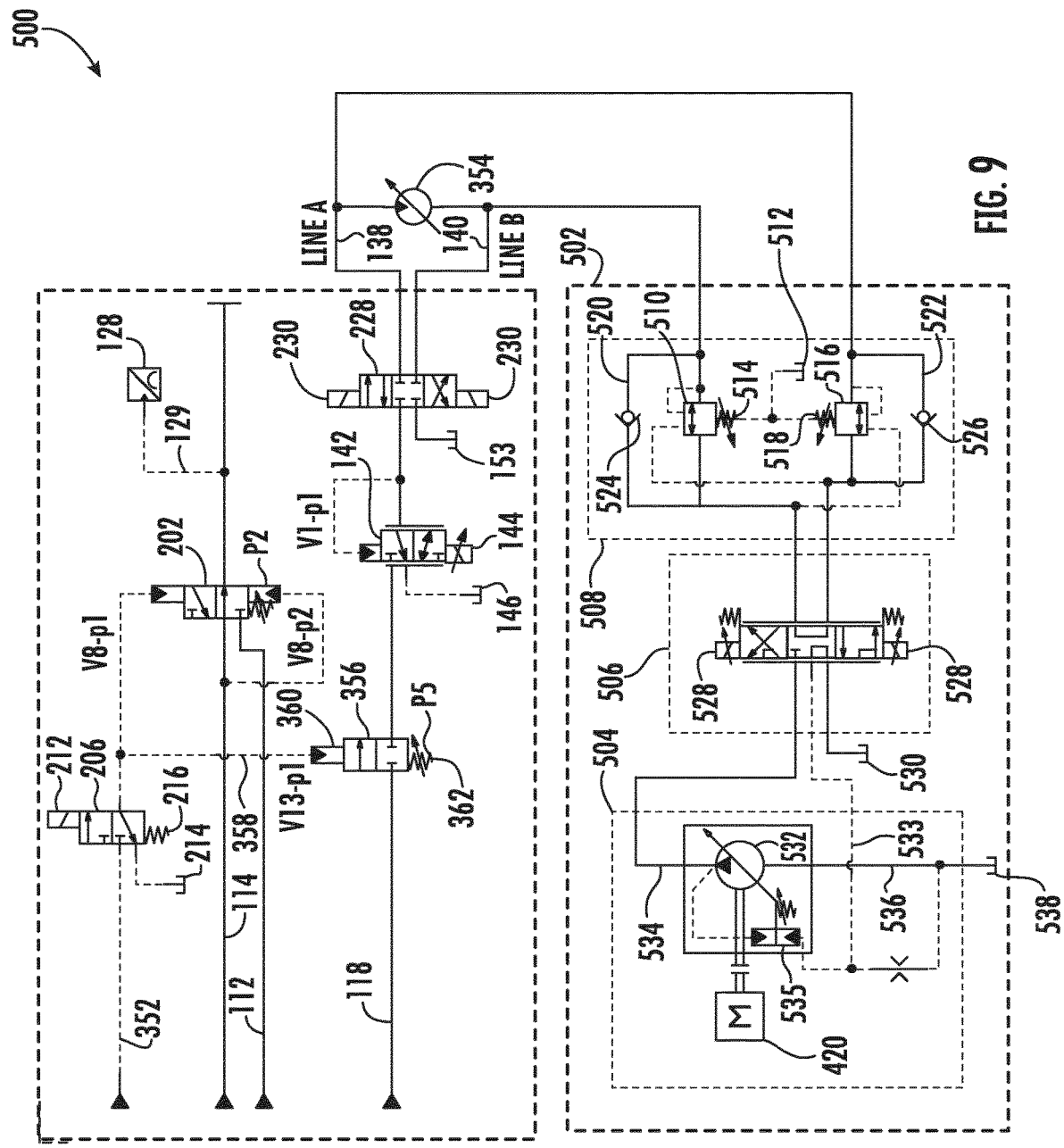
FIG. 9 is a schematic illustration of the adaptive park braking system hydraulic circuit illustrated in FIGS. 1, 3 and 5-8 according to a further embodiment of the disclosure.

FIG. 9 is a schematic illustration of an adaptive park braking system hydraulic circuit (hereinafter the "hydraulic circuit") 500 according to a further embodiment of the disclosure. The hydraulic circuit 500 illustrated in FIG. 9 is the same as the hydraulic circuits 90, 200, 300, 350 and 400 illustrated in FIGS. 1, 3, and 5-8, except where specifically noted below. As illustrated in FIG. 9 of the disclosure, the hydraulic circuit 500 includes a wheeled vehicle hydraulic circuit 502 having a load sensing circuit 504, a proportional distributor 506 and a braking valve circuit 508. It is within the scope of this disclosure and as a non-limiting example that the hydraulic circuit 500 illustrated in FIG. 9 may be an open-circuit hydrostatic transmission.

In accordance with the embodiment of the disclosure illustrated in FIG. 9 and as a non-limiting example, a seventeenth valve 510, of the braking valve circuit 508, is in fluid communication with at least a portion of line B 140 of the one or more power supply hydraulic lines 118 of the hydraulic circuit 500. As best seen in FIG. 9 of the disclosure and as a non-limiting example, the seventeenth valve 510 is interposed between the motor or pomp 354 and the proportional distributor 506 of the hydraulic circuit 500. It is within the scope of this disclosure and as a non-limiting example that the seventeenth valve 510 may be a pressure relieving or pressure reducing valve. When the pressure within line B 140 of the one or more power supply hydraulic lines 118 of the hydraulic circuit 500 exceeds a pre-determined operating pressure OP6, the seventeenth valve 510 opens putting line B 140 in fluid communication with a tank or reservoir 512. Once the pressure within line B 140 of the one or more power supply hydraulic lines 118 falls below the pre-determined operating pressure OP6, the seventeenth valve 510 will close preventing line B 140 from being in fluid communication with the tank or reservoir 512.

According to an embodiment of the disclosure and as a non-limiting example, the seventeenth valve 510 may be electronically controlled by the electronic control unit 80 of vehicle 2. In the event that one or more pressure sensors (not shown) in communication with line B 140 of the one or more power supply hydraulic lines 118 detect a pressure above the pre-determined optimal operating pressure OP6, the electronic control unit 80 will instruct the seventeenth valve 510 to open. Once the pressure within line B 140 of the one or more power supply hydraulic lines 118 has returned to the pre-determined operating pressure OP6, the electronic control unit 80 will instruct the seventeenth valve 510 to close. It is within the scope of this disclosure and as a non-limiting example that the tank or reservoir 512 may be a part of the drain, tanks or reservoirs 146, 153, 162, 176, 182, 188, 214, 408, 412 and/or 430 or may be a separate tank or reservoir from the drain, tanks or reservoirs 146, 153, 162, 176, 182, 188, 214, 408, 412 and/or 430 illustrated in FIGS. 3-9 of the disclosure.

As illustrated in FIG. 9 of the disclosure and as a non-limiting example, the seventeenth valve 510 may include the use of a spring 514. The spring 514 of the seventeenth valve 510 aids in transitioning the seventeenth valve 510 between the open and closed position. It is within the scope of this disclosure and as a non-limiting example that the spring 514 may be a proportional spring.

An eighteenth valve 516, of the braking valve circuit 508, is in fluid communication with at least a portion of line A 138 of the one or more power supply hydraulic lines 118 of the hydraulic circuit 500. As best seen in FIG. 9 of the disclosure and as a non-limiting example, the eighteenth valve 516 is interposed between the motor or pomp 354 and the proportional distributor 506 of the hydraulic circuit 500. It is within the scope of this disclosure and as a non-limiting example that the eighteenth valve 516 may be a pressure relieving or pressure reducing valve. When the pressure within line A 138 of the one or more power supply hydraulic lines 118 of the hydraulic circuit 500 exceeds a pre-determined operating pressure OP7, the eighteenth valve 516 opens putting line A 138 in fluid communication with the tank or reservoir 512. Once the pressure within line A 138 of the one or more power supply hydraulic lines 118 falls below the pre-determined operating pressure OP7, the eighteenth valve 516 will close preventing line A 138 from being in fluid communication with the tank or reservoir 512.

According to an embodiment of the disclosure and as a non-limiting example, the eighteenth valve 516 may be electronically controlled by the electronic control unit 80 of vehicle 2. In the event that one or more pressure sensors (not shown) in communication with line A 138 of the one or more power supply hydraulic lines 118 detect a pressure above the pre-determined optimal operating pressure OP7, the electronic control unit 80 will instruct the eighteenth valve 516 to open. Once the pressure within line A 138 of the one or more power supply hydraulic lines 118 has returned to the pre-determined operating pressure OP7, the electronic control unit 80 will instruct the eighteenth valve 516 to close.

As illustrated in FIG. 9 of the disclosure and as a non-limiting example, the eighteenth valve 516 may include the use of a spring 518. The spring 518 of the eighteenth valve 516 aids in transitioning the eighteenth valve 516 between the open and closed position. It is within the scope of this disclosure and as a non-limiting example that the spring 518 may be a proportional spring.

In fluid communication with at least a portion of line B 140 is a nineteenth valve line 520 and in fluid communication with at least a portion of line A 138 is a twentieth valve line 522. A nineteenth valve 524 is in fluid communication with at least a portion of the nineteenth valve line 520 and a twentieth valve 526 is in fluid communication with at least a portion of the twentieth valve line 522. It is within the scope of this disclosure and as a non-limiting example that the nineteenth and twentieth valves 524 and 26 may be a one-way check valve.

In accordance with the embodiment of the disclosure illustrated in FIG. 9 and as a non-limiting example, the proportional distributor 506 is in fluid communication with at least a portion of the nineteenth and twentieth valve lines 520 and 522 of the hydraulic circuit 500. Additionally, in accordance with the embodiment of the disclosure illustrated in FIG. 9 and as a non-limiting example, the proportional distributor 506 is interposed between the load sensing circuit 504 and the braking valve circuit 508. The proportional distributor 506 may be controlled by one or more solenoids 528. As a non-limiting example, the one or more solenoids 528 may be one or more proportional solenoids.

At least a portion of the proportional distributor 506 is selectively in fluid communication with a tank or reservoir 530. It is within the scope of this disclosure and as a non-limiting example that the tank or reservoir 530 may be a part of the drain, tanks or reservoirs 146, 153, 162, 176, 182, 188, 214, 408, 412, 430 and/or 512 or may be a separate tank or reservoir from the drain, tanks or reservoirs 146, 153, 162, 176, 182, 188, 214, 408, 412, 430 and/or 512 illustrated in FIGS. 3-9 of the disclosure.

The load sensing circuit 504 includes a fifth motor or pump 532 having a first line 534 that is in fluid communication with at least a portion of the proportional distributor 506 and a second line 536 that is in fluid communication with a tank or reservoir 538. As a non-limiting example, the fifth motor or pump 532 of the hydraulic circuit 500 may be a mono-directional variable displacement hydraulic pump. The fifth motor or pump 532 may be may be electronically controlled by using one or more solenoids and/or hydraulically controlled by using one or more hydraulic pilots 535. As a result, it is within the scope of this disclosure and as a non-limiting example that the fifth motor or pump 532 may be a load sensing pump that is in fluid communication with at least a portion of one or more load sensing lines 533 that are in fluid communication with the one or more hydraulic pilots 535 of the load sensing circuit 504. In accordance with the embodiment of the disclosure illustrated in FIG. 9 and as a non-limiting example, at least a portion of an end of the one or more load sensing lines 533 are in fluid communication with at least a portion of the proportional distributor 506. Furthermore, it is within the scope of this disclosure and as a non-limiting example that the tank or reservoir 538 may be a part of the drain, tanks or reservoirs 146, 153, 162, 176, 182, 188, 214, 408, 412, 430, 512 and/or 530 or may be a separate tank or reservoir from the drain, tanks or reservoirs 146, 153, 162, 176, 182, 188, 214, 408, 412, 430, 512 and/or 530 illustrated in FIGS. 3-9 of the disclosure.

It is to be understood that the hydraulic circuit 500 illustrated in FIG. 9 may be in fluid communication with and operably configured to operate in communication with the supply circuit 91 illustrated in FIG. 4 and described previously in the document.

Figure 10:
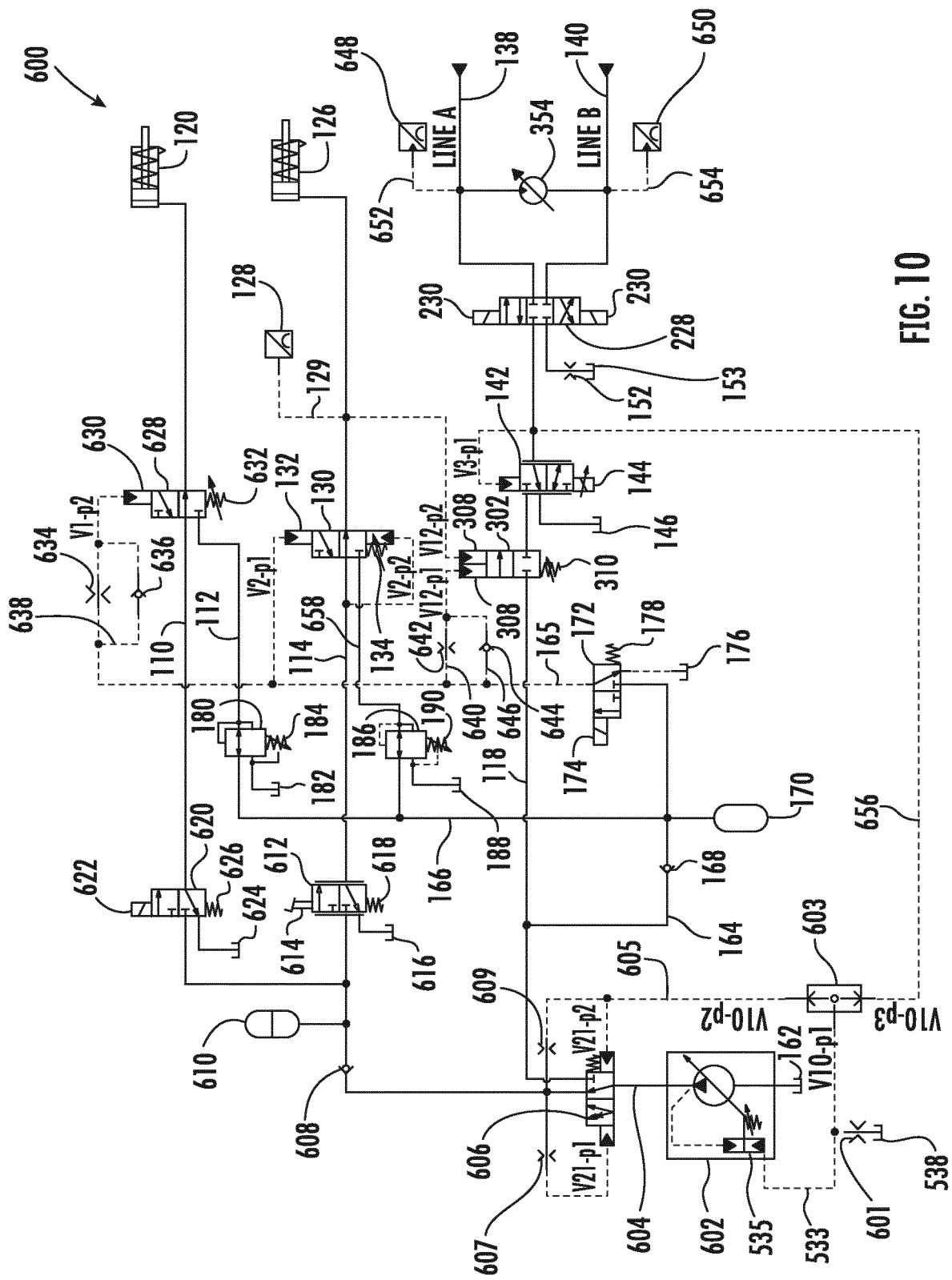
FIG. 10 is a schematic illustration of the adaptive park braking system hydraulic circuit illustrated in FIGS. 1, 3 and 5-9 according to still a further embodiment of the disclosure.

FIG. 10 is a schematic illustration of an adaptive park braking system hydraulic circuit (hereinafter the "hydraulic circuit") 600 according to still a further embodiment of the disclosure. The hydraulic circuit 600 illustrated in FIG. 10 is the same as the hydraulic circuits 90, 200, 300, 350, 400 and 500 illustrated in FIGS. 1, 3, and 5-9, except where specifically noted below. As illustrated in FIG. 10 of the disclosure and as a non-limiting example, the hydraulic circuit 500 includes a sixth motor or pump 602 that is in fluid communication with the tank or reservoir 162 via the return tank line 160. The sixth motor or pump 602 of the hydraulic circuit 600 provides a pressure regulated flow to the hydraulic circuit 600. In accordance with an embodiment of the disclosure and as a non-limiting example, the sixth motor or pump 602 may be a load sending variable displacement pump.

In accordance with an embodiment of the disclosure and as a non-limiting example, the sixth motor or pump 602 may be in fluid communication with at least a portion of the one or more hydraulic pilots 535 and the tank or reservoir 538 via the one or more load sensing lines 533. As best seen in FIG. 10 of the disclosure and as a non-limiting example, a twenty-eighth valve 603 may be in fluid communication with at least a portion of the one or more load sensing lines 533 opposite the one or more hydraulic pilots 535 and/or the tank or reservoir 538. It is within the scope of this disclosure and as a non-limiting example that at least a portion of the twenty-eighth valve 603 may be in fluid communication with at least a portion of one or more first twenty-eighth valve lines 605 and/or one or more second twenty-eighth valve lines 656. Additionally, it is within the scope of this disclosure and as a non-limiting example that at least a portion of the one or more first twenty-eighth valve lines 605 may be in fluid communication with at least a portion of a twenty-first valve 606 and at least a portion of the one or more second twenty-eighth valve lines 656 may be in fluid communication with at least a portion of the third valve 142 of the hydraulic circuit 600. As a result, it is to be understood that the one or more first twenty-eighth valve lines 605 may place the twenty-eighth valve 603 in fluid communication with at least a portion of the twenty-first valve 606 and the one or more second twenty-eighth valve lines 656 may place the twenty-eighth valve 603 in fluid communication with at least a portion of the third valve 142 of the hydraulic circuit 600. It is within the scope of this disclosure and as a non-limiting example that the twenty-eighth valve 603 may be a shuttle valve that selectively places the one or more load sensing lines 533 in fluid communication with the twenty-first valve 606 and/or the third valve 142 of the hydraulic circuit 600.

As illustrated in FIG. 10 of the disclosure and as a non-limiting example, the hydraulic circuit 600 may further include the use of a second orifice 601 that is in fluid communication with the one or more load sensing lines 533 and the tank or reservoir 538. The second orifice 601 aids in stabilizing the load sensing pressure within the one or more load sensing lines 533 of the hydraulic circuit 600.

According to the embodiment of the disclosure illustrated in FIG. 10 and as a non-limiting example, in fluid communication with at least a portion of an output line 604 of the sixth motor or pump 602 and at least a portion of the one or more power supply hydraulic lines 118 of the hydraulic circuit 600 is the twenty-first valve 606. The twenty-first valve 606 of the hydraulic circuit 600 allows for the flow of an amount of fluid (not shown) to a twenty-second valve 608 in fluid communication with at least a portion of the one or more service brake hydraulic lines 114 of the hydraulic circuit 600. As a non-limiting example, the twenty-second valve 608 of the hydraulic circuit may be a one-way check valve that allows for the transmission of an amount of fluid (not shown) from the sixth motor or pump 602 to the one or more service brake hydraulic lines 114 but not in the reverse direction. Additionally, the twenty-first valve 606 of the hydraulic circuit 600 allows for the flow of an excess amount of fluid to towards the third valve 142 of the one or more power supply hydraulic lines 118.

As best seen in FIG. 10 of the disclosure and as a non-limiting example, the twenty-first valve 606 may be in fluid communication with a third orifice 607 and/or a fourth orifice 609. The third and/or fourth orifices 607 and/or 609 aid in stabilizing the functionality of the twenty-first valve 606 of the hydraulic circuit 600.

The hydraulic circuit 600 may further include the use of a second accumulator 610. As best seen in FIG. 10 of the disclosure and as a non-limiting example, the second accumulator 610 is in fluid communication with at least a portion of the one or more service brake hydraulic lines 114 at a point between the twenty-second valve 608 and the second valve 130 of the hydraulic circuit 600. The second accumulator 610 stabilizes the pressure level of the valves upstream of the second accumulator 610 in order to ensure a substantially constant pressure and flow of the one or more parking brake hydraulic lines 110 and the one or more service brake lines 114 of the hydraulic circuit 600 of the vehicle 2, even in the event of a motor or pump failure.

A twenty-third valve 612 may be in fluid communication with at least a portion of the one or more service brake hydraulic lines 114 of the hydraulic circuit 600 at a point between the second accumulator 610 and the second valve 130. According to the embodiment of the disclosure illustrated in FIG. 10 and as a non-limiting example, the twenty-third valve 612 may be manually translated between a first position and a second position by the operator 94 of the vehicle 2 via a lever, a pedal and/or a switch 614 within the cab of the vehicle 2. When activated, the twenty-third valve 612 is in the first position and the one or more service brake hydraulic lines 114 of the hydraulic circuit 600 are pressurized to substantially the same pressure level as the second accumulator 610 of the hydraulic circuit 600. When the twenty-third valve 612 is in the second position, the one or more service brake hydraulic lines 114 of the hydraulic circuit 600 are not pressurized and are in fluid communication with the tank or reservoir 616. It is within the scope of this disclosure and as a non-limiting example that the tank or reservoir 616 may be a part of the drain, tanks or reservoirs 146, 153, 162, 176, 182, 188, 214, 408, 412, 430, 512, 530 and/or 538 or may be a separate tank or reservoir from the drain, tanks or reservoirs 146, 153, 162, 176, 182, 188, 214, 408, 412, 430, 512, 530 and/or 538 illustrated in FIGS. 3-10 of the disclosure. As a non-limiting example, the twenty-third valve 612 may be a 2-position 3-way valve.

It is within the scope of this disclosure and as a non-limiting example, the twenty-third valve 612 may include the use of a spring 618. The spring 618 of the twenty-third valve 612 aids in transitioning the twenty-third valve 612 between the first position and the second position previously described. As a non-limiting example the spring 618 may be a variable spring.

An end of the one or more parking brake hydraulic lines 110, opposite the one or more parking brake assemblies 120, is in fluid communication with at least a portion of the one or more service brake hydraulic lines 114 of the hydraulic circuit 600. As best seen in FIG. 10 of the disclosure and as a non-limiting example, at the end of the one or more parking brake hydraulic lines 110, opposite the one or more parking brake assemblies 120, at a point between the second accumulator 610 and the twenty-third valve 612.

In fluid communication with at least a portion of the one or more parking brake hydraulic lines 110 of the hydraulic circuit 600 is a twenty-fourth valve 620. According to an embodiment of the disclosure and as a non-limiting example, the twenty-fourth valve 620 may be electronically controlled by a solenoid 622. Upon receiving a signal from the electronic control unit 80 of the vehicle 2, the solenoid 622 will transition the twenty-fourth valve 620 between a first position and a second position. When activated, the twenty-fourth valve 620 is in the first position and the one or more parking brake hydraulic lines 110 are pressurized to substantially the same pressure level as the second accumulator 610 of the hydraulic circuit 600. When the twenty-fourth valve 620 is in the second position, the one or more parking brake hydraulic lines 110 of the hydraulic circuit 600 are not pressurized and are in fluid communication with a tank or reservoir 624. It is within the scope of this disclosure and as a non-limiting example that the tank or reservoir 624 may be a part of the drain, tanks or reservoirs 146, 153, 162, 176, 182, 188, 214, 408, 412, 430, 512, 530,

538 and/or 616 or may be a separate tank or reservoir from the drain, tanks or reservoirs 146, 153, 162, 176, 182, 188, 214, 408, 412, 430, 512, 530, 538 and/or 616 illustrated in FIGS. 3-10 of the disclosure. As a non-limiting example, the twenty-fourth valve 620 may be a 2-position 3-way valve.

It is within the scope of this disclosure and as a non-limiting example, the twenty-fourth valve 620 may include the use of a spring 626. The spring 626 of the twenty-fourth valve 620 aids in transitioning the twenty-fourth valve 620 between the first position and the second position previously described. As a non-limiting example the spring 626 may be a variable spring.

Interposed between the twenty-fourth valve 620 and the one or more parking brake assemblies 120 of the hydraulic circuit 600 is a twenty-fifth valve 628. According to the embodiment of the disclosure illustrated in FIG. 10 and as a non-limiting example, at least a portion of the twenty-fifth valve 628 is in fluid communication with at least a portion of the one or more parking brake hydraulic lines 110 and the one or more APB supply hydraulic lines 112 of the hydraulic circuit 600. It is within the scope of this disclosure and as a non-limiting example, the twenty-fifth valve 628 may be hydraulically controlled by one or more hydraulic pilots 630. When the twenty-fifth valve 628 is in the first (non-powered) position, the one or more APB supply hydraulic lines 112 are not in fluid communication with the one or more parking brake hydraulic lines 110 of the vehicle 2. However, when the twenty-fifth valve 628 is in the second (powered) position, the one or more APB supply hydraulic lines 112 are in fluid communication with the one or more parking brake hydraulic lines 110 of the vehicle 2. As a result, the twenty-fifth valve 628 allows for the switching of the supply of fluid (not shown) to the one or more parking brake assemblies 120 by the parking brake switch and the one or more APB supply hydraulic lines 112 of the adaptive park braking system. As a non-limiting example, the twenty-fifth valve 628 of the hydraulic circuit 600 may be a 2-position 3-way valve.

It is within the scope of this disclosure and as a non-limiting example, the twenty-fifth valve 628 may include the use of a spring 632. The spring 632 of the twenty-fifth valve 628 aids in transitioning the twenty-fifth valve 628 between the first position and the second position previously described. It is within the scope of this disclosure and as a non-limiting example that the spring 632 may be a variable spring.

In accordance with the embodiment of the disclosure illustrated in FIG. 10 and as a non-limiting example, at least a portion of the twenty-fifth valve 628 may also be in fluid communication with at least a portion of the one or more hydraulic pilot lines 165 of the hydraulic circuit 600. As a result, it is to be understood that the one or more hydraulic pilot lines 165 of the hydraulic circuit 600 places the fifth valve 172 in fluid communication with the twenty-fifth valve 628.

As best seen in FIG. 10 and as a non-limiting example, the hydraulic circuit 600 may include a fifth orifice 634 that is in fluid communication with the one or more hydraulic pilot lines 165. It is within the scope of this disclosure and as a non-limiting example that the fifth orifice 634 may be interposed between the fifth valve 172 and the twenty-fifth valve 628 of the hydraulic circuit 600.

The hydraulic circuit 600 illustrated in FIG. 10 of the disclosure may further include the use of a fifth orifice bypass line check valve 636 that is in fluid communication with at least a portion of a fifth orifice bypass line 638. At least a portion of a first end of the fifth orifice bypass line 638 is in fluid communication with the one or more hydraulic pilot lines 165 at a point between the fifth valve 172 and the fifth orifice 634. Additionally, at least a portion of a second end of the fifth orifice bypass line 638 is in fluid communication with the one or more hydraulic pilot lines 165 at a point between the fifth orifice 634 and the twenty-fifth valve 628. It is within the scope of this disclosure and as a non-limiting example that the fifth orifice bypass line check valve 636 may be a one-way check valve.

In accordance with the embodiment illustrated in FIG. 10 of the disclosure and as a non-limiting example, the fifth valve 172 of the hydraulic circuit 600 may be in fluid communication with the twelfth valve 302 via one or more twelfth valve lines 640. Interposed between the twelfth valve 302 and the one or more hydraulic pilot lines 165 and in fluid communication with the one or more twelfth valve lines 640 is a sixth orifice 642.

As best seen in FIG. 10 of the disclosure and as a non-limiting example, the hydraulic circuit may further include the use of a sixth orifice bypass line check valve 644 that is in fluid communication with sixth orifice bypass line 646. At least a portion of a first end portion of the sixth orifice bypass line 646 is in fluid communication with the one or more hydraulic pilot lines 165 at a point between the fifth valve 172 and the fifth orifice 634. Additionally, at least a portion of a second end portion of the sixth orifice bypass line 646 is in fluid communication with the one or more twelfth valve lines 640 at a point between the sixth orifice 642 and the twelfth valve 302 of the hydraulic circuit 600. It is within the scope of this disclosure and as a non-limiting example that the sixth orifice bypass line check valve 644 may be a one-way check valve.

It is to be understood that the third, fourth, fifth and/or sixth orifices 607, 609, 634 and/or 642 may act as dampers in order to reduce the overall amount of pressure oscillations that are generated by the operation of the hydraulic circuit 600. As a result, the third, fourth, fifth and/or sixth orifices 607, 609, 634 and/or 642 may aid in improving the overall life and durability of the hydraulic circuit 600.

In accordance with the embodiment of the disclosure illustrated in FIG. 10 and as a non-limiting example, the hydraulic circuit 600 may further include the use of one or more line A pressure sensors 648 and/or one or more line B pressure sensors 650. As illustrated in FIG. 10 and as a non-limiting example, at least a portion of the one or more line A pressure sensors 648 are in fluid communication with at least a portion the line A 138 of the hydraulic circuit 600 via one or more line A pressure sensor lines 652. Additionally, as illustrated in FIG. 10 of the disclosure and as a non-limiting example, at least a portion of the one or more line B pressure sensors 650 may be in fluid communication with at least a portion of the line B 140 of the hydraulic circuit 600. The one or more line A pressure sensors 648 and/or one or more line B pressure sensors 650 may be used in order to determine the pressure within the line A 138 and line B 140 in fluid communication with the motor or pump 354 of the hydraulic circuit 600.

According to an embodiment of the disclosure and as a non-limiting example, at least a portion of the seventh valve 186 may be in fluid communication with at least a portion of the second valve 130. The second valve 130 may be in fluid communication with the seventh valve 186 by using one or more second to seventh valve lines 658. As best seen in FIG. 10 of the disclosure and as a non-limiting example, at least a portion of the one or more second to seventh valve lines 658 may fluidly connect at least a portion of the seventh valve 186 to the one or more hydraulic supply lines 166 of the hydraulic circuit 600.

Figure 11:
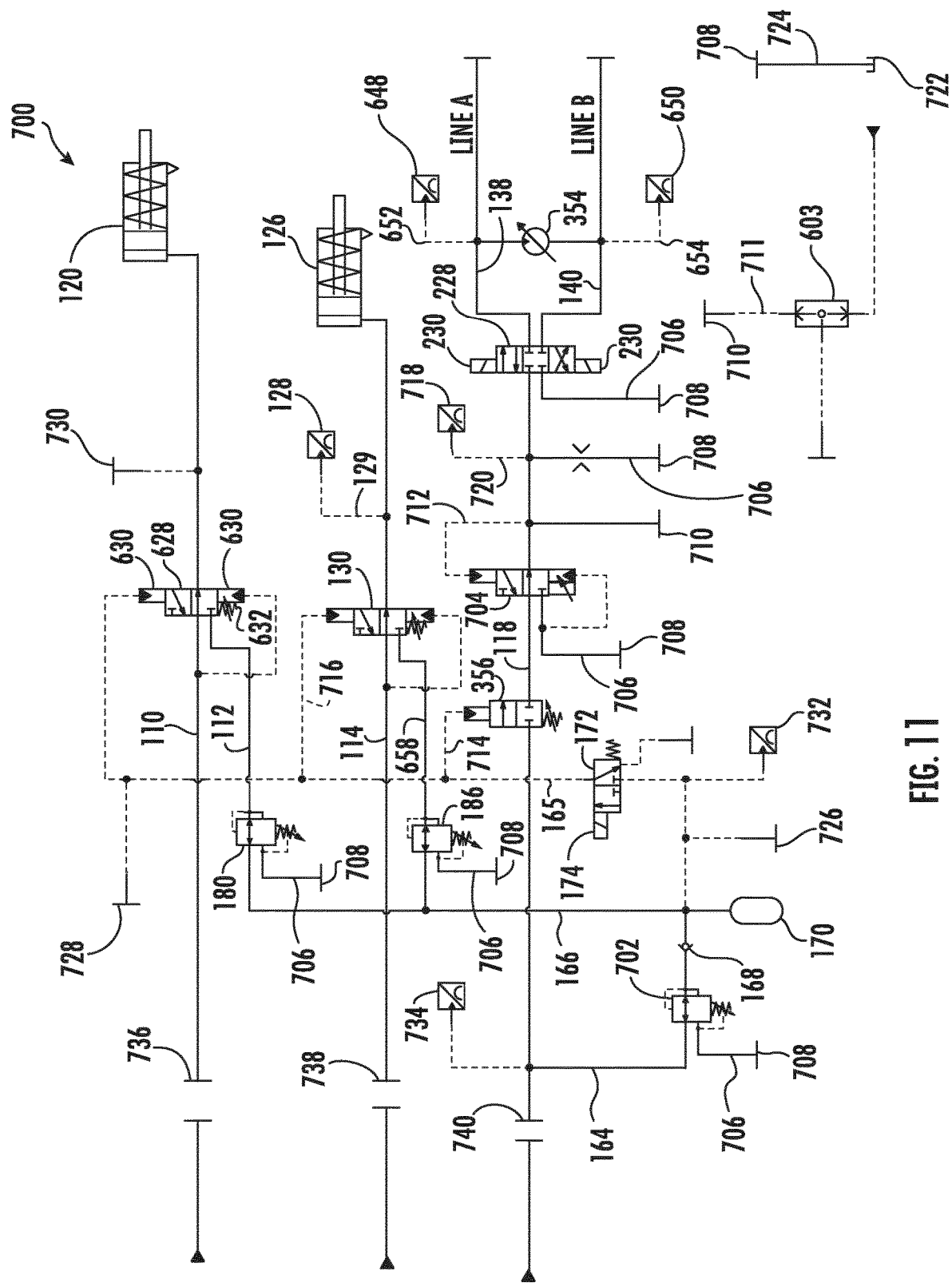
FIG. 11 is a schematic illustration of the adaptive park braking system hydraulic circuit illustrated in FIGS. 1, 3 and 5-10 according to still yet a further embodiment of the disclosure.

FIG. 11 is a schematic illustration of an adaptive park braking system hydraulic circuit (hereinafter the "hydraulic circuit") 700 according to still yet a further embodiment of the disclosure. The hydraulic circuit 700 illustrated in FIG. 11 is the same as the hydraulic circuits 90, 200, 300, 350, 400, 500 and 600 illustrated in FIGS. 1, 3 and 5-10, except where specifically noted below. As illustrated in FIG. 11 of the disclosure and as a non-limiting example, the hydraulic circuit 700 may include the use of a twenty-sixth valve 702 that is in fluid communication with at least a portion of the one or more intermediate hydraulic lines 164 of the hydraulic circuit 700. It is within the scope of this disclosure and as a non-limiting example that the twenty-sixth valve 702 may be in fluid communication with the one or more intermediate hydraulic lines 164 at a point between the one or more check valves 168 and the one or more power supply hydraulic lines 118 of the hydraulic circuit 700. As a non-limiting example the twenty-sixth valve 702 may be a pressure relieving or pressure reducing valve and the twenty-seventh valve 704 may be a 2-position 3-way valve.

As best seen in FIG. 11 of the disclosure and as a non-limiting example, at least a portion of the twenty-sixth valve 702 may be in fluid communication with a one or more first rotary joint supply lines 706. An end of the one or more first rotary joint supply lines 706, opposite the twenty-sixth valve 702, may be in fluid communication with at least a portion of a first rotary joint 708 of the vehicle 2.

In accordance with the embodiment of the disclosure illustrated in FIG. 11 and as a non-limiting example, the hydraulic circuit 700 may further include the use of a twenty-seventh valve 704 that is in fluid communication with at least a portion of the one or more power supply hydraulic lines 118. As best seen in FIG. 11 of the disclosure and as a non-limiting example, the twenty-seventh valve 704 may be interposed between the thirteenth valve 356 and the eleventh valve 228 of the hydraulic circuit 700. It is within the scope of this disclosure and as a non-limiting example that the twenty-seventh valve 704 may be a may be a 2-position 3-way valve.

According to the embodiment of the disclosure illustrated in FIG. 11 and as a non-limiting example, at least a portion of the twenty-seventh valve 704 may be in fluid communication with the first rotary joint 708 via the one or more first rotary joint supply lines 706 of the hydraulic circuit 700. It is within the scope of this disclosure and as a non-limiting example that the one or more first rotary joint supply lines 706 connecting the twenty-seventh valve 704 and the twenty-sixth valve 702 may be the same hydraulic line or separate hydraulic lines.

Additionally, as illustrated in FIG. 11 and as a non-limiting example, the twenty-seventh valve 704 may be in fluid communication with a second rotary joint 710 via a one or more second rotary joint supply lines 712. As a non-limiting example at least a portion of the one or more second rotary joint supply lines 712 may be in fluid communication with at least a portion of the one or more power supply hydraulic lines 118 of the hydraulic circuit 700. In accordance with the embodiment of the disclosure illustrated in FIG. 11 and as a non-limiting example, the one or more second rotary joint supply lines 712 may be in fluid communication with the one or more power supply hydraulic lines 118 at a point between the twenty-seventh valve 704 and the eleventh valve 228. It is within the scope of this disclosure and as a non-limiting example that the second rotary joint 710 may be a load sensing rotary joint.

At least a portion of the twenty-eighth valve 603 may be in fluid communication with at least a portion of the second rotary joint 710 of the vehicle 2. It is within the scope of this disclosure and as a non-limiting example that the twenty-eighth valve 603 may be fluidly connected to the second rotary joint 710 by using one or more first twenty-eighth valve lines 711.

In accordance with the embodiment of the disclosure illustrated in FIG. 11 and as a non-limiting example, at least a portion of the thirteenth valve 356 may be in fluid communication with at least a portion of the one or more hydraulic pilot lines 165 via one or more thirteenth valve lines 714. It is within the scope of this disclosure and as a non-limiting example that the one or more thirteenth valve lines 714 may be in fluid communication with the one or more hydraulic pilot lines 165 at a point between the fifth valve 172 and the twenty-fifth valve 628 of the hydraulic circuit 700.

Additionally, in accordance with the embodiment of the disclosure illustrated in FIG. 11 and as a non-limiting example, at least a portion of the second valve 130 may be in fluid communication with at least a portion of the one or more hydraulic pilot lines 165 via one or more second valve lines 716. It is within the scope of this disclosure and as a non-limiting example that the one or more second valve lines 716 may be in fluid communication with the one or more hydraulic pilot lines 165 at a point between the fifth valve 172 and the twenty-fifth valve 628. In particular, it is within the scope of this disclosure and as a non-limiting example that the one or more second valve lines 716 may be in fluid communication with the one or more hydraulic pilot lines 165 at a point between where the one or more thirteenth valve lines 714 connect with the one or more hydraulic pilot lines 165 and the twenty-fifth valve 628.

Furthermore, in accordance with the embodiment of the disclosure illustrated in FIG. 11 and as a non-limiting example, at least a portion of the sixth valve 180 and/or the seventh valve 186 of the hydraulic circuit 700 may be in fluid communication with at least a portion of the first rotary joint 708 via the one or more first rotary joint supply lines 706. It is within the scope of this disclosure and as a non-limiting example that the one or more first rotary joint supply lines 706 connecting the sixth and/or seventh valves 180 and/or 186 to the first rotary joint 708 may be the same or separate from the one or more first rotary joint supply lines 706 connecting the twenty-sixth valve 702 and/or the twenty-seventh valve 704 to the first rotary joint 708.

At least a portion of the eleventh valve 228 of the hydraulic circuit 700 may be in fluid communication with at least a portion of the first rotary joint 708 via the one or more first rotary joint supply lines 706. It is within the scope of this disclosure and as a non-limiting example that the one or more first rotary joint supply lines 706 fluidly connecting the eleventh valve 228 to the first rotary joint 708 may the same or separate from the one or more first rotary joint supply lines 706 fluidly connecting the second, sixth, twenty-sixth, twenty-seventh valves 130, 180, 702 and/or 704 to the first rotary joint 708.

The hydraulic circuit 700 may further include the use of one or more pressure valve pressure sensors 718 that are in fluid communication with at least a portion of the one or more power supply hydraulic lines 118 via one or more pressure valve hydraulic lines 720. As a non-limiting example, at least a portion of the one or more pressure valve hydraulic lines 720 may connect to the one or more power supply hydraulic lines 118 at a point between the twenty-seventh valve 704 and the eleventh valve 228.

It is within the scope of this disclosure and as a non-limiting example that the one or more pressure valve pressure sensors 718 may be in fluid communication with the first rotary joint 708 of the hydraulic circuit 700 via the one or more first rotary joint supply lines 706. It is therefore to be understood that the one or more first rotary joint supply lines 706 fluidly connecting the one or more pressure valve pressure sensors 718 may the same or separate from the one or more first rotary joint supply lines 706 fluidly connecting the second, sixth, eleventh, twenty-sixth, twenty-seventh valves 130, 180, 228, 702 and/or 704 to the first rotary joint 708.

As best seen in FIG. 11 of the disclosure and as a non-limiting example, at least a portion of the first rotary joint 708 may be in fluid communication with a reservoir or tank 722 via one or more first rotary joint reservoir or tank lines 724. It is within the scope of this disclosure and as a non-limiting example that the tank or reservoir 722 may be a part of the drain, tanks or reservoirs 146, 153, 162, 176, 182, 188, 214, 408, 412, 430, 512, 530, 538, 616 and/or 624 or may be a separate tank or reservoir from the drain, tanks or reservoirs 146, 153, 162, 176, 182, 188, 214, 408, 412, 430, 512, 530, 538, 616 and/or 624 illustrated in FIGS. 3-11 of the disclosure.

The hydraulic circuit 700 may further include the use of one or more first plugs 726, one or more second plugs 728 and/or one or more third plugs 730. As a non-limiting example, at least a portion of the one or more first plugs 726 may be in fluid communication with at least a portion of the one or more intermediate hydraulic lines 164, at least a portion of the one or more second plugs 728 may be in fluid communication with the one or more hydraulic pilot lines 165 and/or at least a portion of the one or more third plugs 730 may be in fluid communication with the one or more parking brake hydraulic lines 110. It is within the scope of this disclosure and as a non-limiting example that the one or more second plugs 728 and/or the one or more third plugs 730 may be pressure sensing plugs.

Additionally, the hydraulic circuit 700 may further include the use of one or more pilot line pressure sensors 732 and/or one or more power supply hydraulic line pressure sensors 734. As best seen in FIG. 11 of the disclosure and as a non-limiting example, at least a portion of the one or more pilot line pressure sensors 732 may be in fluid communication with at least a portion of the one or more hydraulic pilot lines 165 and the one or more power supply hydraulic line pressure sensors 734 may be in fluid communication with at least a portion of the one or more power supply hydraulic lines 118. It is to be understood that the one or more pilot line pressure sensors 732 may be operably configured to determine the pressure within the one or more hydraulic pilot lines 165 and the one or more power supply hydraulic line pressure sensors 734 may be operable configured to determine the pressure within the one or more power supply hydraulic lines 118.

At least a portion of a third rotary joint 736 may be in fluid communication with at least a portion of the one or more parking brake hydraulic lines 110 of the hydraulic circuit 700. In accordance with the embodiment of the disclosure illustrated in FIG. 11 and as a non-limiting example, the third rotary joint 736 may be in fluid communication with an end of the one or more parking brake hydraulic lines 110 opposite the one or more parking brake assemblies 120.

The one or more service brake hydraulic lines 114 may be in fluid communication with at least a portion of a fourth rotary joint 738. As a non-limiting example, at least a portion of the fourth rotary joint 738 may be in fluid communication with an end of the one or more service brake hydraulic lines 114 opposite the one or more service brake assemblies 126.

In accordance with the embodiment of the disclosure illustrated in FIG. 10 of the disclosure and as a non-limiting example, at least a portion of a fourth rotary joint 740 may be in fluid communication with at least a portion of the one or more power supply hydraulic lines 118 of the hydraulic circuit 700. It is within the scope of this disclosure and as a non-limiting example, that the fourth rotary joint 740 may be in fluid communication with an end of the one or more power supply hydraulic lines 118 opposite the motor or pump 354.

The control system (not shown) for the hydraulic circuits 90, 200, 300, 350, 400, 500, 600 and 700 illustrated in FIGS. 1-11 of the disclosure may have several functions. First, the control system has a safety supervisory function that continuously monitors the operation and/or the conditions of the adaptive park braking system described herein. If the safety supervisory function of the control system detects one or more anomalous conditions, the safety supervisory function of the control system disables the adaptive park braking system in a controlled manner.

Second, the control system for the hydraulic circuits 90, 200, 300, 350, 400, 500, 600 and 700 illustrated in FIGS. 1-11 has a slip limit detection function. The slip limit detection function of the control system determines the amount of friction between the ground and one or more of the wheel assemblies 30, 36, 60 and/or 66 of the vehicle 2. This is dependent on several factors such as but not limited to the type of the ground one or more of the wheel assemblies 30, 36, 60 and/or 66 of the vehicle 2 is on, the weather conditions the vehicle 2 is in, the presence of a limited slip of lockable differential assembly within the drive-train 21 of the vehicle 2, the type of the tires of the one or more wheel assemblies 30, 36, 60 and/or 66 the vehicle 2, the amount of wear in the various components of the vehicle 2, the amount of air pressure within one or more of the tires of one or more of the wheel assemblies 30, 36, 60 and/or 66 of the vehicle 2 and the overall weight of the vehicle 2. The maximum amount of torque $T_{MAX}$ applied by the motor is the amount of torque that can be applied to one or more of the wheel assemblies 30, 36, 60 and/or 66 without causing a wheel slip condition.

Third, the motor torque set-point or torque set-point (TSP) is generated. The TSP generated is less than the valve $T_{MAX}$ previously determined.

Finally, the control system for the adaptive park braking system includes an anti-slip function. The anti-slip function of the control system controls the amount of tire slip that the vehicle 2 experiences. It is within the scope of this disclosure that the anti-slip function of the control system tries to maintain the one or more tires of the wheel assemblies 30, 36, 60 and/or 66 of the vehicle 2 in a zero slip state by generating the amount of torque TSP by applying an amount of pressure to the motor needed to generate the amount of torque TSP determined. In the event that a slip condition is detected, a new reduced motor torque set-point or TSP is determined, generated and applied to one or more of the wheel assemblies 30, 36, 60 and/or 66 of the vehicle 2. It is within the scope of this disclosure that the control system may learn the TSP values for a given set of conditions and may continuously update the control system to make the adaptive park braking system more responsive.

There are two control modes for the hydraulic circuits 90, 200, 300, 350, 400, 500, 600 and 700. The first control mode is a reverse control mode. In accordance with the reverse control mode, one or more of the motors and/or pumps of the vehicle 2 push the vehicle backwards against the direction in which the boom arm 96 is moving. This force will aid in reducing, minimizing and/or eliminating the sum of the digging forces, the mechanical backlashes within the drive-train 21 and/or any elastic deformation that may occur within the components of the drive-train 21 when the vehicle 2 is in operation.

The second control mode is a forward control mode. In accordance with the forward control mode, one or more of the motors and/or pumps of the vehicle 2 pushes the vehicle 2 in the direction of the boom arm 96 of the vehicle 2. This force will aid in reducing, minimizing and/or eliminating the sum of the digging forces, the mechanical backlashes within the drive-train 21 and/or any elastic deformation that may occur within the components of the drive-train 21 when the vehicle 2 is in operation. It is within the scope of this disclosure that the amount of generated by the hydraulic circuits 90, 200, 300, 350, 400, 500, 600 and 700 in the forward control mode may less than the amount of force needed to be generated by the hydraulic circuits 90, 200, 300, 350, 400, 500, 600 and 700 in the reverse control mode.

It is within the scope of this disclosure that the various embodiments of the disclosure described and illustrated herein may be combined with one another to make an axle system according to an embodiment of the disclosure.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

PCT PATENT APPLICATION CLAIM ELEMENT REFERENCE NUMBER LIST adaptive park braking system supply circuit 91
one or more parking brake hydraulic lines 110
one or more APB supply hydraulic lines 112
one or more service brake hydraulic lines 114
one or more power supply hydraulic lines 118
one or more service brake assemblies 126
one or more brake pressure sensors 128
one or more brake pressure sensor hydraulic lines 129
motor or pump 136 having a line A 138, is a line B 140
one or more parking brake assemblies 120
first valve 122
second valve 130
third valve 142
fourth valve 148
tank or reservoir 146
second motor or pump 156, hydraulic output line 158
one or more intermediate hydraulic lines 164
One or more check valves 168
one or more accumulators 170
fifth valve 172
one or more hydraulic pilot lines 165
seventh valve 186
sixth valve 180
one or more hydraulic supply lines 166
ninth valve 206
a second ninth valve hydraulic line 210
a second tenth valve hydraulic line 222
eighth valve 202
ninth valve 206
eleventh valve 228
first ninth valve hydraulic line 208
a first tenth valve hydraulic line 220
tenth valve 218
twelfth valve 302
a first twelfth valve hydraulic line 304
a second twelfth valve hydraulic line 306
one or more pilot hydraulic lines 352
thirteenth valve 356
first thirteenth valve hydraulic line 358
closed hydraulic transmission 402
a transmission 404
electric motor 420
third motor or pump 414
a first line 416
a second line 418
fourteenth valve 406
fifteenth valve 410
sixteenth valve 428
intermediate line 436
first intermediate line check valve 438
second intermediate line check valve 440
fourth motor or pump 424
first line 426
wheeled vehicle hydraulic circuit 502
a load sensing circuit 504
proportional distributor 506
a braking valve circuit 508
fifth motor or pump 532
one or more hydraulic pilots 535—The fifth motor or pump 532 may be may be electronically controlled by using one or more solenoids and/or hydraulically controlled by using one or more hydraulic pilots 535
one or more load sensing lines 533
first line 534
second line 536
nineteenth valve line 520 having a nineteenth valve 524
twentieth valve line 522 having a twentieth valve 526
seventeenth valve 510
eighteenth valve 516
sixth motor or pump 602
twenty-first valve 606
twenty-eighth valve 603
an output line 604
one or more first twenty-eighth valve lines 605
one or more second twenty-eighth valve lines 656
twenty-fourth valve 620
twenty-fifth valve 628
twenty-third valve 612
twenty-seventh valve 704

What is claimed is:

1. A method of operating an adaptive park braking system, comprising:
providing a vehicle having a motor, a front axle system, a rear axle system, wherein said front axle system has one or more front axle braking systems and said rear axle system has one or more rear axle braking systems;
identifying when said vehicle is engaged in a digging operation;
disconnecting said front axle system or said rear axle system from driving engagement with said motor of said vehicle;
activating said one or more braking systems of said disconnect axle system to apply an amount of force to said disconnected axle system of said vehicle; and determining an amount of torque needed to reduce, minimize cancel out and/or eliminate the movement experienced by said vehicle when engaged in said digging operation identified;

applying the amount of torque with said motor to said axle system in driving engagement with said motor.

2. The method of operating an adaptive park braking system of claim 1, further comprising the step of identifying whether or not said vehicle is moving when engaged in said digging operation identified.

3. The method of operating an adaptive park braking system of claim 2, further comprising the steps of:

determining said speed in which said vehicle is moving when engaged in said digging identified; and/or determining said direction in which said vehicle is moving when engaged in said digging operation identified.

4. The method of operating an adaptive park braking system of claim 2, further comprising the steps of:

monitoring and determining continuously said speed in which said vehicle is moving and/or said direction in which said vehicle is moving when engaged in said digging operation identified;

updating continuously an amount of torque needed to reduce, minimize cancel out and/or eliminate said movement experienced by said vehicle when engaged in said digging operation identified; and changing continuously said amount of torque applied to said axle system in driving engagement with said motor based on said updated amount of torque determined to reduce, minimize cancel out and/or eliminate the movement experienced by said vehicle when engaged in said digging operation identified.

5. The method of operating an adaptive park braking system of claim 2, further comprising the steps of:

reducing and/or eliminating one or more pits generated under one or more wheels of said vehicle when engaged in said digging operation identified.

6. An adaptive park braking hydraulic circuit, comprising:

one or more service brake hydraulic lines in fluid communication with at least a portion of said one or more service brake hydraulic lines by one or more brake pressure sensor hydraulic lines;

the one or more service brake assemblies in fluid communication with at least a portion of said one or more service brake hydraulic lines;

one or more adaptive park brake (APB) supply hydraulic lines;

one or more power supply hydraulic lines in fluid communication with at least a portion of a motor or pump having a line A and a Line B;

one or more parking brake hydraulic lines;

at least a portion of a first valve in fluid communication with at least a portion of said one or more parking brake hydraulic lines and at least a portion of said one or more APB supply hydraulic lines; and at least a portion of one or more parking brake assemblies in fluid communication with at least a portion of said one or more parking brake hydraulic lines;

at least a portion of a second valve in fluid communication with at least a portion of said one or more service brake hydraulic lines and at least a portion of said one or more APB supply hydraulic lines;

a fourth valve in fluid communication with at least a portion of said one or more power supply hydraulic lines, at least a portion of said Line A and at least a portion of said line B.

7. The adaptive park braking hydraulic circuit of claim 6, further comprising:

an adaptive park braking system supply circuit comprising a second motor or pump, a hydraulic output line, one or more intermediate hydraulic lines, one or more check valves, one or more accumulators, one or more hydraulic pilot lines, one or more hydraulic supply lines, a fifth valve and a seventh valve;

wherein at least a portion of said second motor or pump is in fluid communication with at least a portion of said hydraulic output line;

wherein at least a portion of said hydraulic output line of said second motor or pump is in fluid communication with at least a portion of said one or more power supply hydraulic lines;

wherein said one or more accumulators are in fluid communication with at least a portion of said one or more hydraulic supply lines and at least a portion of said hydraulic output line by said one or more intermediate hydraulic lines having said one or more check valves;

wherein at least a portion of said one or more hydraulic pilot lines are in fluid communication with at least a portion of said one or more hydraulic supply lines, at least a portion of said one or more intermediate hydraulic lines and said one or more accumulators;

wherein said fifth valve is in fluid communication with at least a portion of said one or more hydraulic pilot lines;

wherein at least a portion of said seventh valve is in fluid communication with at least a portion of said one or more APB supply hydraulic lines; and wherein at least a portion of said one or more APB supply hydraulic lines are in fluid communication with at least a portion of said one or more hydraulic supply lines.

8. The adaptive park braking hydraulic circuit of claim 7, wherein said an adaptive park braking system supply circuit further comprises:

a sixth valve; and wherein at least a portion of said sixth valve is in fluid communication with at least a portion of said one or more parking brake hydraulic lines and at least a portion of said one or more hydraulic supply lines.

9. The adaptive park braking hydraulic circuit of claim 6, further comprising:

a ninth valve;

wherein at least a portion of said ninth valve is in fluid communication with at least a portion of said one or more power supply hydraulic lines by a first ninth valve hydraulic line;

an eighth valve;

wherein at least a portion of said eighth valve is in fluid communication with at least a portion of said one or more service brake hydraulic lines and at least a portion of said one or more APB supply hydraulic lines;

wherein at least a portion of said eighth valve is in fluid communication with at least a portion of said ninth valve by a second ninth valve hydraulic line;

a tenth valve;

wherein at least a portion of said tenth valve is in fluid communication with at least a portion of said one or more power supply hydraulic lines;

wherein at least a portion of said tenth valve is in fluid communication with at least a portion of said second ninth valve hydraulic line by a first tenth valve hydraulic line;
wherein at least a portion of said tenth valve is in fluid communication with at least a portion of said eighth valve by a second tenth valve hydraulic line;
an eleventh valve;
wherein at least a portion of said eleventh valve is in fluid communication with at least a portion of said one or more power supply hydraulic lines, said line A of said motor or pump and said line B of said motor or pump;
a third valve; and
wherein said third valve is in fluid communication with at least a portion of said one or more power supply hydraulic lines and is interposed between said tenth valve and said eleventh valve on said one or more power supply hydraulic lines.

10. The adaptive park braking hydraulic circuit of claim 6, further comprising:
a ninth valve;
wherein at least a portion of said ninth valve is in fluid communication with at least a portion of said one or more power supply hydraulic lines by a first ninth valve hydraulic line;
an eighth valve;
wherein at least a portion of said eighth valve is in fluid communication with at least a portion of said one or more service brake hydraulic lines and at least a portion of said one or more APB supply hydraulic lines;
wherein at least a portion of said eighth valve is in fluid communication with at least a portion of said ninth valve by a second ninth valve hydraulic line;
a twelfth valve;
wherein at least a portion of said twelfth valve is in fluid communication with at least a portion of said one or more power supply hydraulic lines;
wherein at least a portion of said twelfth valve is in fluid communication with at least a portion of said second ninth valve hydraulic line by a first twelfth valve hydraulic line;
wherein at least a portion of said twelfth valve is in fluid communication with at least a portion of said one or more service brake hydraulic lines and said one or more brake pressure sensor hydraulic lines by a second twelfth valve hydraulic line;
an eleventh valve;
wherein at least a portion of said eleventh valve is in fluid communication with at least a portion of said one or more power supply hydraulic lines, said line A of said motor or pump and said line B of said motor or pump;
a third valve; and
wherein said third valve is in fluid communication with at least a portion of said one or more power supply hydraulic lines and is interposed between said twelfth valve and said eleventh valve on said one or more power supply hydraulic lines.

11. The adaptive park braking hydraulic circuit of claim 6, further comprising:
one or more pilot hydraulic lines;
a ninth valve;
wherein at least a portion of said ninth valve is in fluid communication with at least a portion of said one or more pilot hydraulic lines;
an eighth valve;
wherein at least a portion of said eighth valve is in fluid communication with at least a portion of said one or more service brake hydraulic lines, at least a portion of said one or more APB supply hydraulic lines and at least a portion of said one or more pilot hydraulic lines;
a thirteenth valve;
wherein at least a portion of said thirteenth valve is in fluid communication with at least a portion of said one or more power supply hydraulic lines;
wherein at least a portion of said thirteenth valve is in fluid communication with at least a portion of said one or more pilot hydraulic lines by a first thirteenth valve hydraulic line;
an eleventh valve;
wherein said eleventh valve is in fluid communication with at least a portion of said one or more power supply hydraulic lines, said line A of said motor or pump and said line B of said motor or pump; and
wherein said eleventh valve is interposed between said thirteenth valve and said motor or pump on said one or more power supply hydraulic lines.

12. The adaptive park braking hydraulic circuit of claim 6, further comprising a closed hydraulic transmission having a transmission;
wherein said transmission has a motor that is operably connected to at least a portion of a third motor or pump with a first line and a second line;
wherein at least a portion of said first line of said third motor or pump is in fluid communication with at least a portion of said line B of said pump or motor;
wherein at least a portion of said second line of said third motor or pump is in fluid communication with at least a portion of said line A of said motor or pump;
an intermediate line;
wherein at least a portion of said intermediate line is in fluid communication with at least a portion of said line A of said motor or pump and said line B of said motor or pump;
wherein said intermediate line is interposed between said third motor or pump and said motor or pump;
a fourth motor or pump;
wherein at least a portion of said fourth motor or pump is in fluid communication with at least a portion of said intermediate line by a first line of said fourth motor or pump;
a sixteenth valve;
wherein said sixteenth valve is in fluid communication with at least a portion of said first line of said fourth motor or pump;
a first intermediate line check valve;
wherein at least a portion of said first intermediate line check valve is in fluid communication with said intermediate line at a point between where said intermediate line is fluidly connected to said first line of said fourth motor and said line B of said motor or pump;
a second intermediate line check valve; and
wherein at least a portion of said second intermediate line check valve is in fluid communication with said intermediate line at a point between where said intermediate line is fluidly connected to said first line of said fourth motor and said line A of said motor or pump.

13. The adaptive park braking hydraulic circuit of claim 6, further comprising:
a load sensing circuit;
  wherein said load sensing circuit has a motor that is operably connected to at least a portion of a fifth motor or pump with a first line and a second line;
  wherein said fifth motor or pump is electronically controlled by one or more hydraulic pilots that are in fluid communication with at least a portion of one or more load sensing lines and at least a portion of said second line of said fifth motor or pump;
a braking valve circuit comprising a seventeenth valve, an eighteenth valve, a nineteenth valve line, a twentieth valve line, a nineteenth valve and a twentieth valve;
  wherein at least a portion of said seventeenth valve is in fluid communication with at least a portion of said line B of said motor or pump;
  wherein at least a portion of said eighteenth valve is in fluid communication with at least a portion of said line A of said motor or pump;
  wherein at least a portion of said nineteenth valve line is in fluid communication with at least a portion of said line B of said motor or pump at a point between said seventeenth valve and said motor or pump;
  wherein said nineteenth valve is in fluid communication with at least a portion of said nineteenth valve line;
  wherein at least a portion of said twentieth valve line is in fluid communication with at least a portion of said line A of said motor or pump at a point between said motor or pump and said eighteenth valve;
  wherein at least a portion of said twentieth valve is in fluid communication with at least a portion of said twentieth valve line;
a proportional distributor; and
  wherein said proportional distributor is in fluid communication with at least a portion of said first line of said fifth motor or pump, said one or more load sensing lines, said nineteenth valve line, said twentieth valve line, said line A of said motor or pump and/or said line B of said motor or pump.

14. The adaptive park braking hydraulic circuit of claim 6, further comprising:
a sixth motor or pump;
  wherein said sixth motor or pump is controlled by one or more hydraulic pilots that are in fluid communication with at least a portion of one or more load sensing lines and at least a portion of said sixth motor or pump;
a twenty-first valve is in fluid communication with at least a portion of an output line of said sixth motor or pump and said one or more service brake hydraulic lines;
a twenty-eighth valve is in fluid communication with at least a portion of said one or more load sensing lines, at least a portion of one or more first twenty-eighth valve lines and at least a portion of one or more second twenty-eighth valve lines;
wherein at least a portion of an end of said one or more first twenty-eighth valve lines, opposite said twenty-eighth valve, is in fluid communication with at least a portion of said twenty-first valve and/or said one or more service brake hydraulic lines;
wherein at least a portion of an end of said one or more second twenty-eighth valve lines, opposite said twenty-eighth valve, is in fluid communication with at least a portion of said one or more power supply hydraulic lines;
a twenty-fourth valve is in fluid communication with at least a portion of said one or more parking brake hydraulic lines;
a twenty-fifth valve is in fluid communication with at least a portion of said one or more parking brake hydraulic lines at a point between said twenty-fourth valve and said one or more parking brake assemblies on said one or more parking brake hydraulic lines;
a twenty-third valve is in fluid communication with at least a portion of said one or more service brake hydraulic lines;
a twelfth valve is in fluid communication with at least a portion of said one or more power supply hydraulic lines;
an eleventh valve is in fluid communication with at least a portion of said one or more power supply hydraulic lines, said line A of said motor or pump and said line B of said motor or pump;
a third valve is in fluid communication with at least a portion of said one or more power supply hydraulic lines at a point between said eleventh valve and said twelfth valve on said one or more power supply hydraulic lines;
an adaptive park braking system supply circuit; and
  wherein at least a portion of said adaptive park braking system supply circuit is in fluid communication with at least a portion of, said twenty-third valve, said twelfth valve and/or said second valve.

15. The adaptive park braking hydraulic circuit of claim 6, further comprising:
a twenty-fifth valve is in fluid communication with at least a portion of said one or more parking brake hydraulic lines;
a thirteenth valve is in fluid communication with at least a portion of said one or more power supply hydraulic lines;
an eleventh valve is in fluid communication with at least a portion of said one or more power supply hydraulic lines, said line A of said motor or pump and said line B of said motor or pump;
a twenty-seventh valve is in fluid communication with at least a portion of said one or more power supply hydraulic lines at a point between said thirteenth valve and said eleventh valve on said one or more power supply hydraulic lines;
an adaptive park braking system supply circuit; and
  wherein at least a portion of said adaptive park braking system supply circuit is in fluid communication with at least a portion of said twenty-fifth valve, said second valve and said thirteenth valve.

* * * * *